(12) United States Patent
Frederick

(10) Patent No.: US 9,171,440 B2
(45) Date of Patent: Oct. 27, 2015

(54) APPARATUS AND METHOD FOR METAL DETECTION USING RADIO FREQUENCY REFLECTION

(75) Inventor: Thomas J. Frederick, Chapel Hill, NC (US)

(73) Assignee: Clairvoyant Technology LLC, Chapel Hill, NC (US)

( * ) Notice: Subject to any disclaimer, the term of this patent is extended or adjusted under 35 U.S.C. 154(b) by 0 days.

(21) Appl. No.: 13/813,464

(22) PCT Filed: Aug. 23, 2011

(86) PCT No.: PCT/US2011/048730
§ 371 (c)(1),
(2), (4) Date: Jan. 31, 2013

(87) PCT Pub. No.: WO2012/027317
PCT Pub. Date: Mar. 1, 2012

(65) Prior Publication Data
US 2013/0169466 A1    Jul. 4, 2013

Related U.S. Application Data

(60) Provisional application No. 61/376,781, filed on Aug. 25, 2010.

(51) Int. Cl.
*G08B 13/24* (2006.01)
*G01S 13/88* (2006.01)
(Continued)

(52) U.S. Cl.
CPC ............. *G08B 13/2402* (2013.01); *G01S 13/04* (2013.01); *G01S 13/56* (2013.01); *G01S 13/86* (2013.01); *G01S 13/887* (2013.01); *G08B 13/248* (2013.01); *G08B 13/2448* (2013.01)

(58) Field of Classification Search
USPC .................................................. 324/326–329
See application file for complete search history.

(56) References Cited

U.S. PATENT DOCUMENTS 3,769,575 A * 10/1973 Rist et al. ....................... 324/329
5,214,410 A * 5/1993 Verster .......................... 340/505
(Continued)

FOREIGN PATENT DOCUMENTS

KR    100769880 B1 * 10/2007 ................ H03J 7/00

OTHER PUBLICATIONS

Clairvoyant Technology LLC, International Application No. PCT/US2011/048730, International Search Report and Written Opinion, Dec. 6, 2011.
(Continued)

*Primary Examiner* — Jay Patidar
(74) *Attorney, Agent, or Firm* — Steven B. Phillips; Moore & Van Allen PLLC

(57) ABSTRACT

A radio frequency (RF) metal detector and an electronic article surveillance (EAS) system are disclosed. The RF metal detector in example embodiments transmits an RF signal. A receiver measures the power and phase of the signal as reflected from metallic objects in an interrogation zone. The RF metal detector can be deployed in a combined system that performs multiple functions. For example, the RF metal detector can be integrated with an EAS system that also sends RFID commands and receives RFID responses. In some embodiments the metal detector can discriminate between moving metal objects and stationary metal objects, and/or discriminate between objects in the interrogation zone and objects outside the interrogation zone. An antenna or antennas can be connected in a mono-static or bi-static configuration and the phase and power signals can be either DC-coupled or AC-coupled into the system through a mixer.

16 Claims, 13 Drawing Sheets

(51) Int. Cl.
*G01S 13/04* (2006.01)
*G01S 13/56* (2006.01)
*G01S 13/86* (2006.01)

(56) References Cited

U.S. PATENT DOCUMENTS

| | | | | |
|---|---|---|---|---|
| 5,825,298 | A * | 10/1998 | Walter | 324/329 |
| 6,356,230 | B1 | 3/2002 | Greef | |
| 6,639,509 | B1 | 10/2003 | Martinez | |
| 6,879,161 | B2 | 4/2005 | Rowan | |
| 7,327,802 | B2 | 2/2008 | Sanders et al. | |
| 7,521,890 | B2 * | 4/2009 | Lee et al. | 320/108 |
| 2006/0091888 | A1 * | 5/2006 | Holman et al. | 324/326 |
| 2006/0293018 | A1 * | 12/2006 | Reynolds | 455/324 |
| 2007/0096881 | A1 | 5/2007 | Pillai | |
| 2007/0206704 | A1 | 9/2007 | Zhou et al. | |
| 2008/0055080 | A1 * | 3/2008 | Britton | 340/551 |
| 2008/0063102 | A1 | 3/2008 | Okunev | |
| 2008/0143584 | A1 | 6/2008 | Shoarinejad | |
| 2009/0045917 | A1 | 2/2009 | Volpi et al. | |
| 2010/0039264 | A1 | 2/2010 | Bergman | |
| 2010/0060423 | A1 * | 3/2010 | Pillai | 340/10.1 |
| 2010/0099355 | A1 | 4/2010 | Rofougaran et al. | |
| 2010/0109844 | A1 | 5/2010 | Carrick | |
| 2010/0176947 | A1 | 7/2010 | Hall | |
| 2010/0321165 | A1 * | 12/2010 | Lee | 340/10.4 |

OTHER PUBLICATIONS

Clairvoyant Technology LLC, International Application No. PCT/US2011/048730, International Preliminary Report on Patentability, Aug. 20, 2012.

Clairvoyant Technology LLC, International Application No. PCT/US2012/038587, International Search Report and Written Opinion, Aug. 8, 2012.

Karode, S.L., et al., Feedforward Embedding Circulator Enhancement in Transmit/Receive Applications, IEEE Microwave and Guided Wave Letters, Jan. 1998, pp. 33-34, vol. 8, No. 1.

Xiong, Ting-Wen, et al., High TX-to-RX Isolation in UHF RFID Using Narrowband Leaking Carrier Canceller, IEEE Microwave and Wireless Components Letters, Feb. 2010, pp. 124-126, vol. 20, No. 2.

Kraus, John, D., Antennas, Second Edition, 1988, pp. 19-26.

Van Trees, Harry L., Detection Estimation, and Modulation Theory: Part I. Detection, Estimation, and Linear Modulation Theory, 2001, pp. 33-36, 246-251.

Yamazaki, Sadao, et al., Basic Analysis of a Metal Detector, IEEE Transactions on Instrumentation and Measurement, Aug. 2002, pp. 810-814, vol. 51, No. 4.

Chekcheyev, S., A Temperature-Stable Metal Detector, IEEE Transaction on Instrumentation and Measurement, Jun. 2009, pp. 1907-1910, vol. 58, No. 6.

European Patent Office, European Application No. 11820489.0 Supplementary European Search Report dated Aug. 25, 2014, 8 pages.

* cited by examiner

APPARATUS AND METHOD FOR METAL DETECTION USING RADIO FREQUENCY REFLECTION

This patent application claims priority from U.S. Patent Application Ser. No. 61/376,781, filed on Aug. 25, 2010.

BACKGROUND ART

Conventional metal detectors rely on mutual inductance or eddy current detection and make use of a coil to generate an alternating magnetic field. The range of a metal detector is typically limited to between one and two meters depending on coil size and operating frequency. Increasing the range requires larger coil diameters. Typical metal detection systems used in security applications use this technique to detect the presence of metal objects moving through an interrogation zone. Common examples of such systems are used at security checkpoints at airports or court houses. Such metal detection systems need to be calibrated in order to maintain the correct detection threshold for the operating environment.

Retail stores have long made use of "electronic article surveillance" or EAS, which is used to detect shoplifters. EAS systems commonly in use today employ magnetic or electromagnetic fields to detect tags placed on items in the stores. There has been a recent movement toward using radio frequency identification (RFID) for retail EAS. When an item is paid for the tag on that item is deactivated or removed at the point of sale. The EAS system at the exit detects the presence of active tags as they leave the store, indicating the presence of an item which has not been purchased and is being stolen. When the EAS system detects a tag, an alarm is activated for the retailer's loss prevention team.

Some shoplifters construct shopping bags lined with layers of aluminum foil to block the magnetic or radio frequency (RF) fields from detecting the tags on shoplifted items as they exit the store. As a countermeasure to foil-lined bags, some retailers are placing metal detection systems as described above at the entry/exit points of the store to detect the presence of the foil-lined bags. These metal detection systems are functionally placed side-by-side with the existing RFID systems, although these independent systems may use the same mounting hardware, stanchions or alert systems.

DISCLOSURE OF EMBODIMENTS OF THE INVENTION

Embodiments of the present invention provide apparatus and methods for using radio frequencies for metal detection. The apparatus according to embodiments of the invention includes a radio frequency (RF) metal detector. The RF metal detector in example embodiments transmits an RF field into an interrogation zone using one or more antennas. The RF metal detector has a receiver to measure the power and phase of reflections of its transmitted signal from any metallic objects in the interrogation zone. In some embodiments, the RF metal detector is integrated with another RF device to reduce system costs and add value.

A metal detector according to some embodiments of the invention includes a transmitter to transmit an incident RF signal and a receiver to receive the signal back from metal objects. The received signal can be referred to herein as a returned or a reflected RF signal. A processor connected to the transmitter and the receiver with appropriate supporting circuitry is operable to detect metal objects by processing at least a portion of the reflected RF signal.

The metal detector in example embodiment makes use of an antenna or a plurality of antennas. In some embodiments, the metal detector operates by making phase and power measurements for the reflected RF signal. In some embodiments, the processor is operable to discriminate between moving metal objects and stationary metal objects using the phase and power measurements of the reflected RF signal received by the antenna or the plurality of antennas over time. In some embodiments, a plurality of antennas are arranged on different sides of the interrogation zone and the processor is operable to use the plurality of antennas to discriminate between objects in the interrogation zone and objects outside the interrogation zone.

In some embodiments, the metal detector operates in a mono-static configuration, where the same antenna (or antennas) is (are) used for transmitting and receiving RF signals. A coupler or circulator connected to the transmitter and receiver enable an antenna to work both ways. In some embodiments, the metal detector operates in a bi-static configuration, where separate antennas are used for transmitting and receiving. In some embodiments, the metal detector operates as a DC-coupled system, where the phase and power signals from a mixer are DC-coupled to an analog-to-digital converter through a lowpass filter. In other embodiments, the metal detector operates as an AC-coupled system, where the phase and power signals from the mixer are AC-coupled to the analog-to-digital converter through a bandpass filter.

The RF metal detector can be integrated with another device for convenience and to reduce total cost. In some embodiments, the RF metal detector is integrated with an electronic article surveillance (EAS) system. In such an embodiment, the incident RF signal is modulated with one or more radio frequency identification (RFID) commands. This modulation can be accomplished with a digital-to-analog converter. In such an embodiment, the processor is operable to both detect metal objects and determine RFID responses for tags in the interrogation zone by processing at least a portion of the returned RF signal. In some such embodiments, the processor detects metal objects by measuring the phase and power of the returned RF signal during an RFID receive slot.

The RF metal detector operates in at least some embodiments by transmitting the incident RF signal and measuring a phase and a power in the returned RF signal. The phase and power over time are then compared to "entry" criteria. A determination is made as to when the phase and the power over time meet the entry criteria for a specified period of time. The metal detector can then signal that a metal object has been detected based on the determination. In at least some embodiments, a determination is also made as to whether the power in the returned RF signal meets an exit criteria for an additional period of time prior to the signaling that a metal object has been detected. In some embodiments this determination is made for a plurality of antennas that sense the returned RF signal. In embodiments where the RF metal detector is integrated with an EAS system, the incident RF signal is modulated with RFID commands and RFID responses are extracted from the returned RF signal during RFID receive slots.

The process of metal detection or combined metal detection and RFID communication can be implemented by means of processor together with appropriate transmitter and receiver hardware and an antenna or antennas. The processor can be exemplified by a digital signal processor or controller executing appropriate microcode, firmware or software stored in the metal detector or EAS system. Alternatively, the processor can be hard-wired circuits or one or more custom integrated circuits, or a combination of any of these.

BRIEF DESCRIPTION OF THE DRAWINGS

FIG. 11 shows the signal flow as firmware stored in a memory.

BEST MODES FOR CARRYING OUT THE INVENTION

Figure 1:
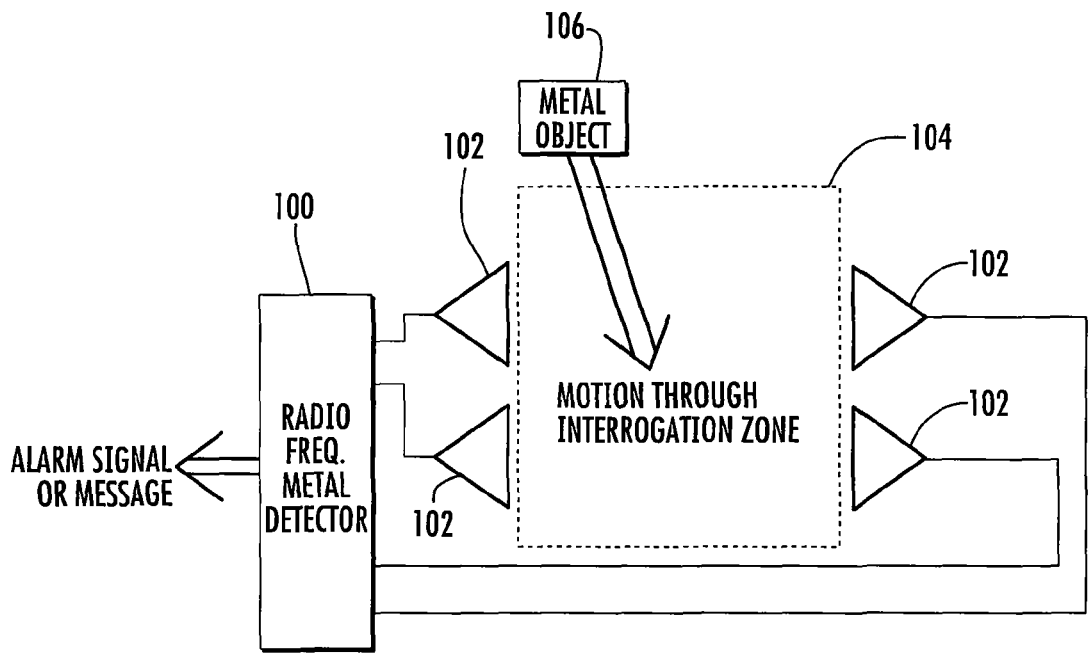
FIG. 1 is a functional block diagram of an example operating environment for an RF metal detector according to embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" or "coupled" to another element, it can be directly connected or coupled to the other element or intervening elements may be present.

As previously mentioned, embodiments of the present invention provide a system and method for using radio frequencies for metal detection. The system can be embodied in an apparatus such as an RF metal detector that transmits an RF field into an interrogation zone using one or more antennas. The RF metal detector can use its receiver to measure the power and phase of reflections of its transmitted signal from metallic objects in the interrogation zone. It should be noted that by use of the term "radio frequency" or "RF" herein, reference is being made to systems and methods which use electromagnetic energy at frequencies where far-field effects dominate in typical metal detection environments, as opposed to inductive or other systems, which are near-field based. Such frequencies, for example, may be those over 100 kHz, but would typically be at least 300 MHz or at least 500 MHz.

Unlike radar systems, the RF metal detector according to example embodiments does not employ time of flight or time difference of arrival techniques to measure range or calculate position. The RF metal detector of example embodiments also does not require modulation or pulse compression techniques to create high time-bandwidth product signals. In at least some embodiments, the RF metal detector uses continuous wave RF signals such that the required bandwidth is extremely narrow and easily satisfies most regulatory requirements. The term "continuous wave" as used in this disclosure with reference to RF signals refers to RF signals that enable metal detection without time-of-flight, time difference of arrival, or modulation techniques common in longer range systems such as radar systems. The term does not necessarily imply that a signal is transmitted continuously over a specific period time, that the signal does not contain modulation used for other purposes in system with multiple functions, or modulation used to enhance the metal detection function when specifically stated. This RF metal detector is well suited to be integrated with UHF or microwave RFID interrogators. For example, the passive RFID tags based around the ISO 18000-6C protocol, also known as "Gen2", are, as of this writing, beginning to be employed in EAS systems. The Gen2 technology uses transmit frequencies above 800 MHz, specifically, from 860 MHz to 960 MHz. The type of radio system needed in a Gen2 interrogator is also very well suited to the proposed RF metal detector so that both functions can be integrated into the same device. This design, wherein a method for RF metal detection is included with the reading of Gen2 tags, can offer an efficient system since such as system detects both RFID tags and foil-lined bags.

A block diagram of the operating environment of an example RF metal detector 100 is shown in FIG. 1. The metal detector is attached to one or more antennas 102 used to cover an interrogation zone 104 where a metal object 106 is to be detected moving through the interrogation zone. In some embodiments, the antennas may be functionally treated as part of the metal detector. In other embodiments, the metal detector and the antennas may be referred to as a "system." The metal detector 100 contains a transmitter and a receiver. In some embodiments transmit RF power is routed to a transmit antenna or transmit antennas and reflected RF power is received through from a separate receive antenna or separate receive antennas. Such a metal detection system may be referred to as being in a bi-static configuration. If the same antenna or plurality of antennas is used for both transmitting and receiving, the system may be referred to as being in a mono-static configuration. The metal detector can be used be detect metal objects in motion in the interrogation zone by detecting the phase and power changes of the reflected or returned RF signal as described in detail in the following paragraphs. When a metal object is detected moving through the interrogation zone, then an alarm signal or message is sent to activate an audio and/or visual alarm as indicated in FIG. 1. Alternatively or in addition, an alarm message may be sent to a host controller.

Figure 2:
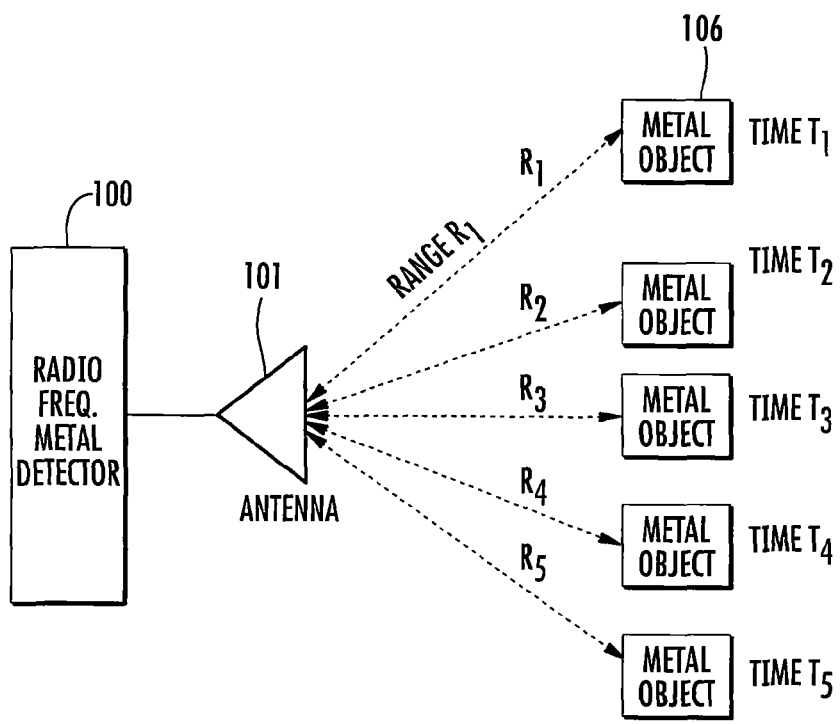
FIG. 2 is a high-level block diagram illustrating the operation of an RF metal detector according to example embodiments of the invention.

FIG. 2 illustrates more details regarding the operation of the RF metal detector according to embodiments of the invention. For clarity, it will be assumed that a single antenna 101 is used for both transmit and receive functions (mono-static configuration). The transmit RF wave will propagate through free space a distance R defined as the range to metal object 106. If the metal object has dimensions relative to the wavelength λ of the RF wave such that the object is in the optical or resonant region, then a significant portion of the RF wave hitting the metal object will be reflected back toward antenna 101. In some embodiments, the metal detector may work better if the antenna is linearly polarized since for circular polarization, the reflected RF wave will have reversed polarization. The reversed polarization of the reflected RF wave may make it poorly received, since the returned wave will have the opposite polarization as the antenna. The reflected RF signal will be sensed by the antenna and be received by the metal detector; that is passed into the receiver circuitry of the metal detector for processing. The round-trip propagation length of the received RF wave is 2·R, which imparts a 360· (2R)/λ degree phase shift of the reflected RF signal relative to the transmitted RF signal. If the metal object 106 is in motion as shown diagrammatically in FIG. 2, this phase shift will vary as a function of time. FIG. 2 shows the metal object at five different instants in time. At times $T_1$ and $T_2$ the metal object is coming into the interrogation zone and the ranges $R_1$ and $R_2$ are getting shorter. Therefore the total phase shift of the RF wave is decreasing, until at time $T_3$ the range $R_3$ is at its shortest length when the metal object 106 moves tangential to the antenna. After this point in time the range begins to increase and so the phase shift begins to increase.

For an object approaching and then moving past an antenna in a straight line as shown in FIG. 2, if the object has constant speed S, then using basic trigonometry the range R as a function of time can be expressed:

$$R(t)=\mathrm{sqrt}(R_3^2+(S\cdot(t-T_3))^2)$$

where $R_3$ is the minimum range to the antenna, which occurs at time $T_3$. It follows that the phase angle, expressed in degrees, would be:

$$P(t)=360\cdot 2\cdot\mathrm{sqrt}(R_3^2+(S\cdot(t-T_3))^2)/\lambda.$$

Figure 3:
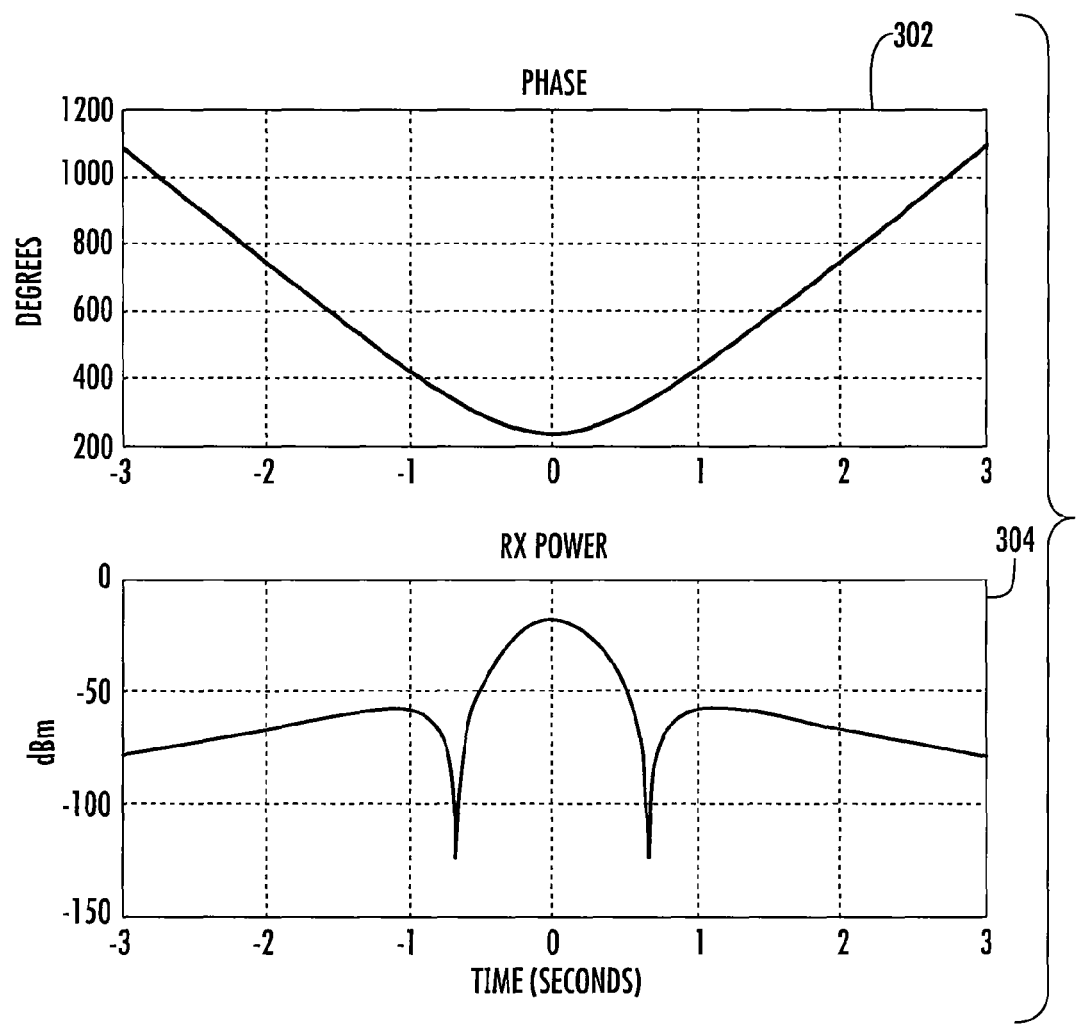
FIG. 3 shows example graphs of phase and power over time for an RF return signal being processed by an RF metal detector according to example embodiments of the invention.

This phase is plotted in the top half 302 of FIG. 3 with minimum range $R_3$=1 meter, speed S=1.5 meters/second, wavelength λ=⅓ meter (corresponding to approximately 915 MHz carrier frequency), and time of minimum distance taken as $T_3$=0, without loss of generality.

The power of the reflected signal is also a function of position of the metal object. Many variables affect the reflected power received at the antenna, including the transmitted power, the angular gain pattern of the antenna, the path loss of the propagated RF wave, and the scatter aperture of the metal object. The bottom half 304 of FIG. 3 illustrates the receive power, in dBm, for the same metal object moving at 1.5 meters/second past the antenna. The transmit power used for this plot is 30 dBm and the antenna gain is 9 dB. The "nulls" in receive power occurring at +/−0.67 seconds in this example are due to the angle of the object relative to the antenna pattern, specifically the object moves between side lobes and the main antenna lobe at those instants. Again, the plots have taken $T_3$=0 as the instant which the object moves closest to the antenna. For time less than 0 the object is getting closer to the antenna, and for time greater than zero the object is moving farther from the antenna. At time $T_3$=0 the metal object moves tangential to the antenna, at which point the receive signal power is highest, the range is shortest, and the phase goes from decreasing to increasing. This characteristic of the power and phase curves can be used to detect metal objects moving through the interrogation zone. Multipath fading effects may add noise and distortion to the power and phase curves, but there is typically adequate signal-to-noise ratio to achieve good detection results. As will be seen in the following paragraphs, in at least some embodiments it is advantageous to know the maximum rate of change of the phase of the reflected signal due to an object in motion. This quantity will be denoted $dP_{max}$ and is obtained by considering an object moving directly toward the antenna at maximum speed:

$$dP_{max}=360\cdot S_{max}/(\lambda/2)=360\cdot S_{max}/((c/F_C)/2),$$

where $S_{max}$ is the maximum speed, λ is the wavelength, "c" is the speed of light, and $F_C$ is the carrier frequency. The maximum speed is application dependent. Consider an EAS application using the 915 MHz instrument, scientific, and medical (ISM) band in the United States. If the maximum speed is assumed to be 5 meters/second and the maximum carrier frequency in this ISM band is 928 MHz, then $dP_{max}$ is approximately 11,144 degrees/second.

Figure 4:
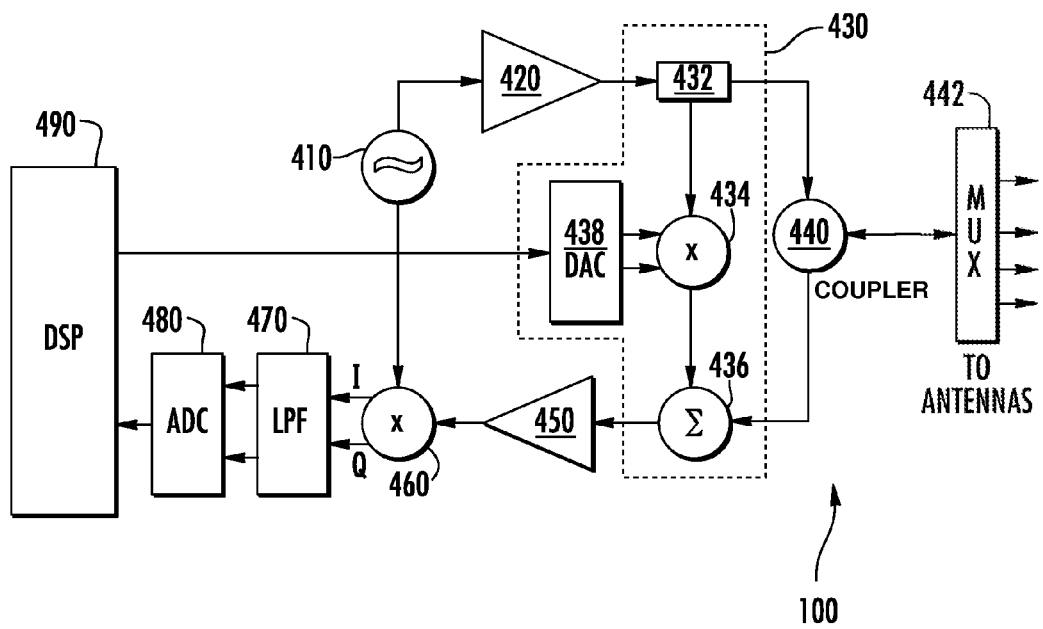
FIG. 4 is a detailed functional block diagram of an RF metal detector according to some example embodiments of the invention. In this example, the RF metal detector is a "DC-coupled" system.

FIG. 4 is a more detailed block diagram view of the RF metal detector 100 from FIG. 1. The components of the metal detector in this example include RF oscillator 410, typically operating in the VHF, UHF, SHF, or EHF bands, RF power amplifier (PA) 420 to create the high power transmit signal to deliver to the transmit antenna, an active transmit-to-receiver isolation circuit 430 to improve metal detection sensitivity. Isolation circuit 430 can be used in either mono-static or bi-static configurations. The isolation circuit 430 includes coupler 432 to sample a portion of the transmit signal, vector modulator 434 or other means to adjust the amplitude and phase of the sampled transmit signal, a digital-to-analog converter, or DAC 438 to control the vector modulator 434, and combiner circuit 436 to subtract the adjusted transmit replica. For purposes of this disclosure, component 440 will be referred to as a coupler. However, although coupler 440 can be a coupler in the traditional sense, coupler 440 can also be a circulator or any other component used in mono-static configurations to connect the shared transmit/receive antenna(s) to the transmitter circuitry and receive circuitry. In bi-static configurations (not shown) separate transmit and receive antennas are used so that no coupler is required.

Still referring to FIG. 4, a multiplexing circuit (MUX) 442 is included in the metal detector to switch the transmitter and receiver circuitry between antennas if multiple antennas are needed to cover the interrogation zone. RF low noise amplifier (LNA) 450 is used to amplify the receive signal. A quadrature receive mixer 460 uses the RF oscillator 410 to translate the receive signal from RF to baseband in-phase (I) and quadrature-phase (Q) signals. Low pass filter (LPF) 470 removes unwanted out-of-band signals from the baseband receive signal and an analog-to-digital converter (ADC) 480 samples the baseband I and Q signals. Digital signal processor (DSP) 490 together with software or firmware algorithms running on the DSP filters the sampled baseband I and Q signals to detect the reflected signal from metal objects in motion through the interrogation zone. A variety of types of processors can be used to provide these functions. A processor to operate the system can consist of or include a DSP, embedded controller, microprocessor, programmable logic array, or even dedicated, customized hard-wired circuitry.

Other optional components not shown in FIG. 4 may include RF bandpass filters, isolators, baseband anti-aliasing or anti-imaging filters, etc. FIG. 4 represents only one example embodiment of the device; other hardware implementations are possible. For example, the LNA 450 could be omitted for a lower cost version of the device. FIG. 4 represents a direct conversion radio wherein baseband signals are translated directly to/from RF in a single mixing stage. Other radio configurations are possible within the scope of this disclosure. For example, a super-heterodyne radio wherein an intermediate frequency is generated either with a second mixer or directly within the DSP could be implemented in an embodiment of the invention. These and any other alternative embodiments of the device should be considered to fall within the scope of this invention disclosure.

The detailed operation of the example metal detector of FIG. 4 is as follows. The RF oscillator 410 creates a sinusoidal signal at the desired operating frequency. The RF oscillator may be programmable such that it can generate various frequencies over its rated operating range, such as 860 MHz to 960 MHz for a UHF oscillator capable of covering the various ISM bands, which are used for passive UHF RFID. For a programmable oscillator, the DSP 490 could program the oscillator 410 as needed to meet the regulatory requirements of the ISM band in which it is operating. For example, both the U.S. FCC Part-15 band and the ETSI EN302208 band use multiple frequency channels, which the radio must hop between in order to operate continuously. If the device employs frequency hopping, the frequency hopping must be accounted for in the phase processing method. The RF oscillator output is routed to the PA 420 as well as the quadrature receive mixer 460. In this way the transmitter and receiver use a common reference signal so that only the phase shift due to the RF propagation is measured.

Still referring to FIG. 4, the output from the PA 420 is connected to the coupler 432. The coupler is part of the active transmitter-to-receiver isolation circuit 430, which will be described below. The coupler 432 samples a small portion of the transmit signal and directs it to the vector modulator 434, but most of the transmit power passes through the coupler 432 to coupler 440. Coupler 440 is only required in mono-static antenna configurations, which is when the same antenna element is used for both transmit and receive functions. In bi-static antenna configurations (not shown), the coupler 432 would be connected to a transmit antenna multiplexer, and a separate receive antenna multiplexer would be connected to the summing combiner 436. However, the bi-static configuration may be less desirable due to the increased cost and complexity of twice the number of antennas and cables to cover the same interrogation zone. Nonetheless, this embodiment of the invention can be applied equally well to the bi-static antenna configuration. For the mono-static mode shown in FIG. 4, the coupler 440 is used to isolate the transmit RF power from the receive RF power. The transmit RF power is conducted from the PA 420 through the coupler 432, through the coupler 440 out to the antenna multiplexor 442 and on to the currently selected antenna. The receive RF power is conducted from the currently selected antenna back through the multiplexor 442 through the coupler 440 and into the receive path starting at the combiner 436.

As can be seen in FIG. 4, both transmit and receive power are flowing through the transmission lines and circuitry between the coupler 440 and the selected antenna. The purpose of coupler 440 is to separate the two directions of conducted RF power so that transmit RF power flows to the antennas and not into the receive path while receive RF power flows into the receive path and not back into the transmit path. Typically the transmit power is 30 dB to 100 dB stronger than the received power at the front end of the radio, i.e., at the multiplexor 442. For example, under U.S. FCC part-15 regulatory operation the conducted transmit power out to the antenna might be +30 dBm, while the received signal coming back into the antenna could be −50 dBm or lower. Since the propagation delay of the signal reflected off of a metal object is only tens of nanoseconds and the reflected signal is exactly the same frequency as the transmitted signal, there is no way to separate the transmit signal from the reflected signal via filtering. Since the metal detector's receive sensitivity should be 60 dB to 80 dB below the transmit power level to have good performance, a system may require very high transmit-to-receive isolation. Put another way, the system may need to be designed so that very little of the transmit power coming from the PA 420 leaks into the input of the LNA 450 so that the system can be sensitive enough to detect reflected power from a moving metal object.

In mono-static antenna configurations the coupler 440 as shown in FIG. 4 will typically only provide about 20 dB of isolation between the transmit and receive paths. Another issue in mono-static antenna configurations is antenna return loss, which is the ratio of the RF power delivered to the antenna to the power reflected from the antenna. For RF systems the return loss is a function how well the impedance of the antenna is matched to the characteristic impedance of the transmission line (usually a coaxial cable), which connects to the antenna. Expressed in decibels, the return loss typically ranges from 10 dB for a poor match to 20 dB or more for a good antenna impedance match. The portion of transmit power that is reflected back from the antenna is conducting the same direction as the receive signal, and so the coupler 440 passes it through to the receiver. Thus, for transmit power of +30 dBm and an antenna return loss of 10 dB, +20 dBm of transmit power would be conducted into the receiver.

Such strong leakage from the transmitter into the receiver would blind the receiver and make the metal detector inoperable. Even for bi-static antenna configurations the isolation between transmit and receive antenna elements is typically only 40 dB at best, which is still not enough to achieve good detection sensitivity.

The isolation circuit 430 as shown in FIG. 4 is necessary in this embodiment of the invention to improve the sensitivity and range of the metal detection system by improving the isolation between the transmitter and the receiver. A portion of the transmit signal is taken by the coupler 432 and routed to the vector modulator 434. The vector modulator 434 adjusts the amplitude and phase of the signal so that the vector modulator output is the same amplitude but 180 degrees out of phase from the transmit signal coming from coupler 440.

Provided the vector modulator 434 produces a signal of equal amplitude and exactly out of phase from the transmit leakage signal then transmit signal will be completely eliminated at the output of the combiner 436. The amplitude and phase of the vector modulator 434 is controlled by the DSP 490 through a dual DAC 438. If the amplitude and phase of the vector modulator output are not substantially perfectly matched with the transmitter leakage, there is some un-cancelled transmit signal at the output of the combiner 436 which passes on into the receive path. The remainder of the receive path is described below as a prerequisite to describing the control algorithm to adjust the DAC 438 to minimize transmitter leakage into the receiver.

The output of the combiner 436 in FIG. 4 is passed to the LNA 450 to provide some gain prior to the down-converting receive mixer 460. In a pure metal detection application where the receiver requires limited sensitivity of −50 dBm to −60 dBm, then LNA 450 may not be required. However, if the metal detection function is integrated into an RFID interrogator or other radio transceiver such as an 802.11 or 802.15 modem, then LNA 450 may be required to achieve the required noise figure. The receive mixer 460 converts the incoming RF signal to baseband and passes the unfiltered I and Q signals to the LPF 470. The LPF 470 removes interfering signals from other radio transmitters on nearby RF channels. The design of LPF 470 depends on carrier frequency chosen, the maximum speed of the metal objects, as well as any additional functionality performed by the radio device. For metal detection functionality the LPF must pass the maximum frequency shift due to moving objects in the interrogation zone, which is:

$$F_{max}=dP_{max}/360.$$

As an example of the above, consider a device operating in the 915 MHz ISM band of the United States where the maximum expected speed $S_{max}$=5 meters/second. $dP_{max}$ is calculated as approximately 11,144 degrees/second, which leads to $F_{max}$=30.95 Hertz. If this same device where operating in a 2.45 GHz ISM band then $F_{max}$=81.72 Hertz. If the metal detector is integrated with some other radio function, such as an RFID reader used for metal detection in an EAS application, then the requirements of the LPF 470 as shown in FIG. 4 will largely be driven by the other radio functions. For example, in an RFID reader implementing the Gen2 protocol the LPF would need to have a corner frequency of somewhere between 350 KHz and 1 MHz, depending on the return link frequencies being used. The output of the LPF 470 is passed to the ADC 480 which samples the analog filtered I and Q signals. The sampling rate of the ADC 480, denoted $F_S$, is best set 8 to 10 times higher than the maximum frequency into the ADC, so that the aliasing effect is avoided and accurate signal measurements can be taken. Typically there is a tradeoff where increasing the sampling frequency results in reduced complexity for the LPF 470. For a metal detection system integrated with a Gen2 RFID interrogator, the ADC sampling frequency $F_S$=10 MHz would work well.

The DSP 490 of FIG. 4 may use filtering techniques to average the ADC samples so that an accurate estimate of the reflected carrier I and Q signals is obtained. The time span of the digital filtering, or the "observation window" used to generate digitally filtered I and Q output samples, is N samples, where $T_{observation}=N/F_S$ is the observation window for the current phase and power measurement. The duration of the observation window should be much smaller than the time required for the object to move half of a wavelength. It is best to keep the observation time to less than a few degrees so that the I and Q signals are not changing significantly during the averaging. For example, if the operating frequency is in the 915 MHz U.S. FCC ISM band and the metal objects can move as fast as 5 meters per second then one half wavelength can be travelled in 32.8 milliseconds, which corresponds to the time for the reflected signal phase to rotate 360 degrees. Therefore, the minimum time for 2 degrees of phase rotation is about 182 microseconds. If, in FIG. 4, ADC 480 is sampling at 10 MHz, then this corresponds to 1820 samples to average with a digital filter to produce the I and Q measurements. DSP 490 may use an N tap finite impulse response (FIR) filter, such as a minimum 4-term Blackman-Harris function, to calculate the estimated I and Q values.

In system like that shown in FIG. 4, these digitally filtered I and Q measurements are used to estimate the reflected transmit signal, plus any un-cancelled component of transmit leakage. Regarding the un-cancelled transmit leakage, we now return to the control algorithm to adjust DAC 438 to minimize transmitter leakage into the receiver, mentioned above. DAC 438 can be adjusted to cancel transmitter leakage through the device circuitry, reflections from the antenna interface impedance mismatch, plus any static reflections from stationary objects in the interrogation zone. The system design should consider what is "stationary" verses what is in motion. DAC 438 should be adapted to track slow variations in the circuitry and environment due to component drift and environmental variation. However, if the closed loop bandwidth of the DAC adaptation is too high then metal objects in motion, which are the targets for detection, will also be canceled. To avoid this, define $S_{min}$ as the minimum speed an object must be moving to be detected. Then the minimum frequency, which must be un-cancelled by the isolation circuit 430 is:

$$F_{min}=dP_{min}/360,$$

where, $$dP_{min}=360 \cdot S_{min}/(\lambda/2).$$

Again using the 915 MHz ISM band as an example, consider $S_{min}$=0.1 meters/second. In the United States 915 MHz ISM band, the minimum carrier frequency is $F_C$=902 MHz, which yields $F_{min}$=0.60 Hertz. This suggests that the closed loop isolation system should have a time constant in the tens of seconds range. The closed loop isolation system in the example of FIG. 4 includes the isolation circuit 430, the receive path through components 450, 460, 470, and 480, and the DAC update algorithm running in the DSP 490. Any number of adaptation algorithms can be used inside DSP 490 to update DAC 438 based on the digitally filtered I and Q measurements. The objective function of the adaptation algorithm is always to drive the I and Q signals to zero (minimizing the transmitter leakage). The adaptation bandwidth of the algorithm running on the DSP 490 is kept low so that signals on the I and Q inputs due to objects moving faster than $S_{min}$ are not cancelled. One example embodiment uses an alternating minimization. Other possibilities include the Nelder-Mead downhill simplex technique or a multi-input/multi-output linear control loop. These and many other DAC adaptation algorithms can be used.

Figure 5:
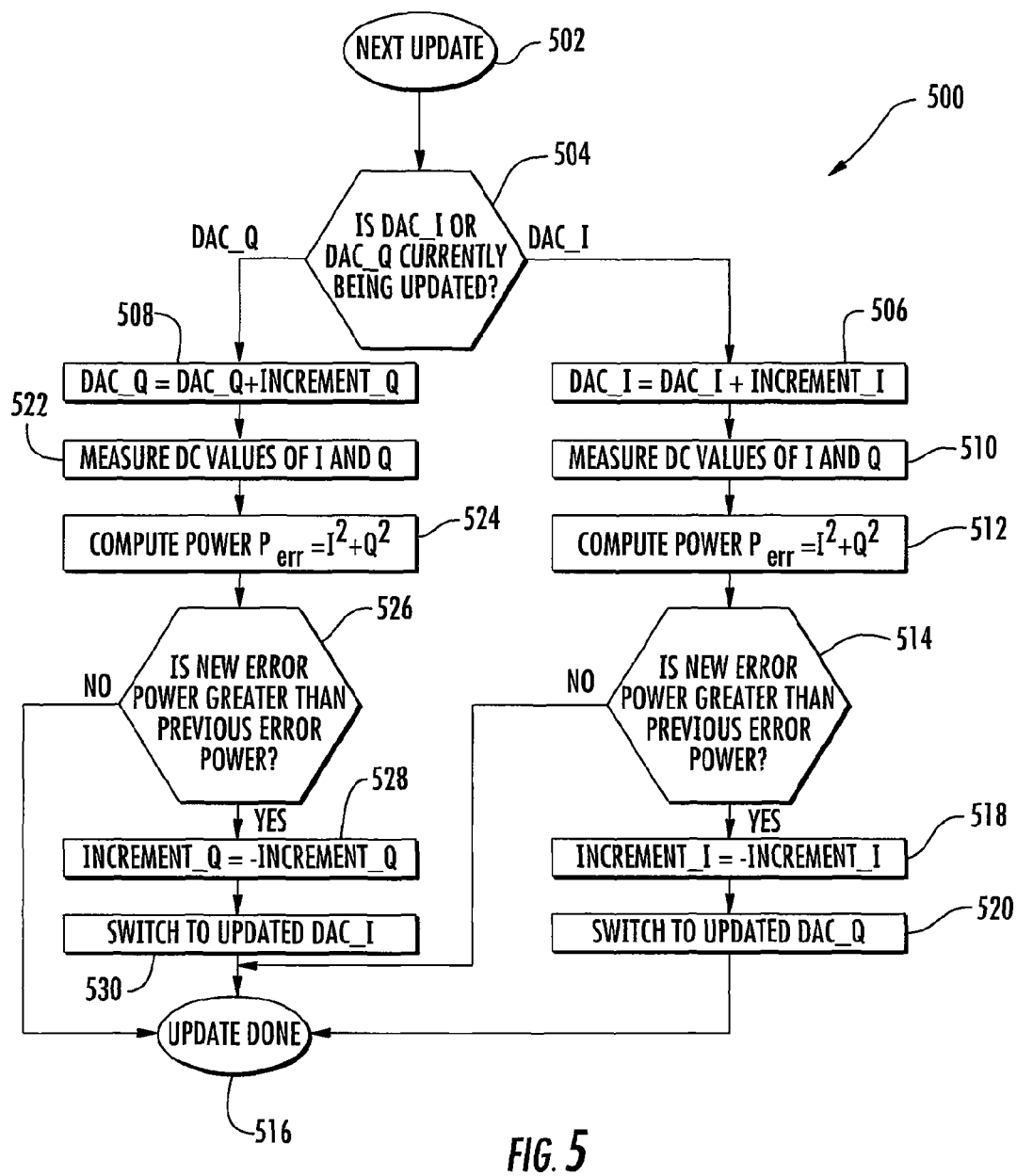
FIG. 5 is a flowchart illustrating an example alternating minimization adaptation algorithm that can be used with example embodiments of the invention.

FIG. 5 is a flowchart that illustrates the process 500 of an example adaptation algorithm that can be used to drive the I and Q signals to zero as discussed above. Like most flowcharts, the flowchart of FIG. 5 illustrates the process as a series of subprocess blocks. The particular algorithm illustrated in FIG. 5 is an alternating minimization algorithm. To fully understand the algorithm, denote the un-cancelled transmit power leaking into the receiver as $P_{ERR}$, which is functionally related to the DAC control values and the reflection coefficient of the antenna. The relationship between the DAC values, denoted here as DAC_I and DAC_Q, and $P_{ERR}$ is typically a convex surface with a single global minimum, for example, an elliptic paraboloid similar to that defined by:

$$P_{ERR} = ((DAC\_I - OPT\_I)/a)^2 + (DAC\_Q - OPT\_Q)/b)^2,$$

where OPT_I and OPT_Q are the unknown optimum values for DAC_I and DAC_Q which will minimize the transmitter leakage $P_{ERR}$. The OPT_I and OPT_Q values are primarily influenced by the unknown antenna reflection coefficient, but also influenced by other nuisance parameters such as DC offset voltages in the demodulation mixer, LPF, ADC, and/or DAC, and nonlinearities in vector modulators or reflective modulators. The values of OPT_I and OPT_Q are unknown and must be searched for using the algorithm. In general, the values of OPT_I and OPT_Q will vary slowly with time and so some iterative algorithm is best. The other two parameters "a" and "b" in the equation above arise because of the unequal gains in the I/Q paths in the baseband circuitry both in the receive path and in the DAC control path.

Turning more specifically to FIG. 5, each update begins at block 502. At block 504, an update mode setting determines whether the algorithm is currently updating DAC_I or DAC_Q. At block 506, INCREMENT_I is incremented. INCRDMENT_I is a state variable, which defines the size and direction of the DAC_I search. At block 508, INCREMENT_Q is incremented. INCREMENT_Q is a state variable, which defines the size and direction of the DAC_Q search. The previous value of the error power from the last update iteration is stored in $P_{ERR}$.

The algorithm of FIG. 5 updates periodically, for example every 100 milliseconds. The update mode is either to adapt DAC_I or adapt DAC_Q. If the mode is to update DAC_I, then DAC_I is modified with the current value of INCREMENT_I, which is a signed value such that the DAC_I value may increase or decrease depending on the current search direction. After the DAC_I value has been modified and written out through the DAC, the baseband values of I and Q are measured at block 510 as previously discussed. The new power $P_{ERR}$ is computed at block 512 and compared to the previous value at block 514. If the new value is lower, then the update is done at block 516. However, if the new value is higher then the direction of the search is switched by negating INCREMENT_I at block 518, and the update mode is switched to search the DAC_I output at block 520.

Still referring to FIG. 5, if the mode is to update DAC_Q, then DAC_Q is modified with the current value of INCREMENT_Q, which is a signed value such that the DAC_Q value may increase or decrease depending on the current search direction. After the DAC_Q value has been modified and written out through the DAC, the baseband values of I and Q are measured at block 522 as previously discussed. The new power $P_{ERR}$ is computed at block 524 and compared to the previous value at block 526. If the new value is lower, then the update is done at block 516. However, if the new value is higher then the direction of the search is switched by negating INCREMENT_Q at block 528, and the update mode is switched to search the DAC_Q output at block 530.

As discussed previously, the closed loop bandwidth of the carrier cancellation DAC should have a time constant in the tens of seconds range so as to not cancel the reflections from objects moving through the interrogation zone. The time constant for the process of FIG. 5 is controlled by how often the "Next update" is executed, in addition to the magnitude of the INCREMENT_I, INCREMENT_Q values. If the algorithm is updated every 100 milliseconds with INCREMENT_I and INCREMENT_Q set equal to 1 least significant bit of the DAC, then the time constant of the carrier cancellation loop will be fast enough to track slow variations in the circuitry without cancelling reflections from moving objects.

The curves in FIG. 3 were calculated using an idealized model where the moving object's parameters of distance, speed, scatter aperture, and orientation relative to the antenna were used in formulas to create the curves. The phase and receive power curves in practice will vary with these parameters, and in practice these parameters are not known and are not fully observable. Only the baseband I/Q signals are measureable. The receive signal power is calculated as:

$$P_{RX} = I^2 + Q^2,$$

and the phase is calculated as the four-quadrant arctangent using the baseband I and Q signals:

$$\theta_{RX} = a\tan 2(Q, I).$$

Figure 6:
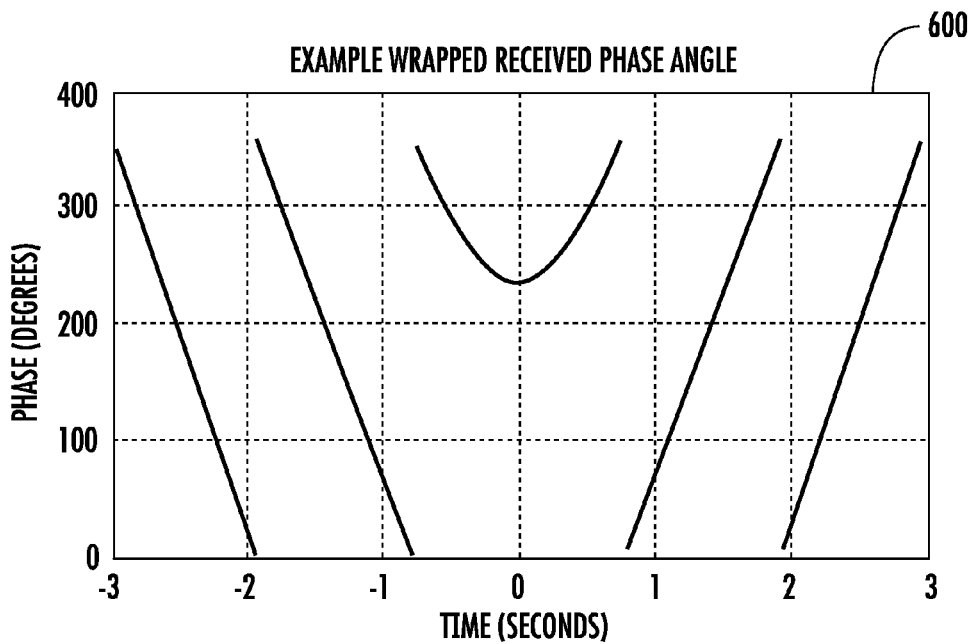
FIG. 6 is a plot of the idealized output of a phase unwrapping function used with example embodiments of the RF metal detector.

This phase function wraps modulo 360 degrees. The implementation of the arctangent formula above would yield an output phase as shown in graph 600 of FIG. 6. This wrapped phase is what is observable given the baseband I and Q signals. The phase curve as shown in FIG. 3 is an "unwrapped" version of the phase, which must be computed inside the DSP using an unwrapping algorithm. To interpret the computed phase meaningfully, any jump in phase larger than 180 degrees is unwrapped so that the phase appears as a continuous curve, as in FIG. 3.

For example, if the sequence of a tan 2 phase measurements is denoted as $\theta_{RX}(n)$, and the unwrapped phase measurement is denoted as $\phi_{RX}(n)$, then the unwrapped measurement can be obtained with the following steps:

Compute $\omega_{RX}(n) = \theta_{RX}(n) - \theta_{RX}(n-1)$     1.

If $\omega_{RX}(n) > 180$, then $\omega_{RX}(n) = \omega_{RX}(n) - 360$     2.

If $\omega_{RX}(n) < -180$, the $\omega_{RX}(n) = \omega_{RX}(n) + 360$     (3.

$\phi_{RX}(n) = \phi_{RX}(n-1) + \omega_{RX}(n)$     4.

This process produces a continuous phase trajectory as is shown in the top of FIG. 3, to within an arbitrary constant. The arbitrary constant is unknown and does not matter since the absolute range is not needed in this metal detection method.

The system must only compare phase measurements taken using the same frequency. Some regulatory schemes such as FCC Part-15 in the United States require the radio hop between different carrier frequencies, such as 50 frequencies in the FCC case. Because the carrier frequency and therefore wavelength are different, the phase of the received reflected signal will be different for different frequencies. Thus, when a frequency hop occurs, the metal detection algorithm must account for an abrupt phase shift in the reflected signal. This sudden phase shift does not reflect actual movement in the object, just a difference in wavelength. Since the DSP typically controls the frequency of the oscillator, handling these frequency hops is not problematic. Also as will be seen in the description below, the detection method disclosed may use phase slope estimates, dP, which are a function of the raw and unwrapped phase, $\theta_{RX}(n)$ and $\phi_{RX}(n)$, respectively. The software algorithm can be designed so that when a frequency hop occurs, a new phase slope estimate is generated.

The phase slope can be calculated using a least squares formula from a set of N unwrapped phase samples, $\phi_{RX}(n)$, taken at times t(n), where without loss of generality, n=0 through N−1 are taken. The slope of the phase over these N samples is:

$$dP = [\text{mean}(t(n) \cdot \phi_{RX}(n)) - \text{mean}(t(n)) \cdot \text{mean}(\phi_{RX}(n))] / [\text{mean}(t(n)^2) - \text{mean}(t(n))2],$$

where mean( ) denotes the samples average sum(×(n))/N.

With the phase wrapping, if the phase is not being calculated frequently enough for how fast an object is moving then an aliasing effect occurs, and it is not possible to accurately know if the phase is increasing or decreasing from the observable statistics, namely the baseband I and Q signals. To be more specific, as the range R changes by $\lambda/2$, the phase changes by 360 degrees since the RF wave must travel round trip, out to the metal object then back again. Thus, in this example, the signal should be sampled at least twice as fast as the metal object moves $\lambda/2$ so there is no ambiguity as to what direction the unwrapped phase is moving. Therefore, the minimum phase calculation rate depends on the operating frequency (wavelength) and the expected maximum speed of the meal objects. Common unlicensed ISM radio bands exist at 433 MHz, 915 MHz, 2.45 GHz, and 5.8 GHz, at least in the United States. There are design trade-offs that should be accounted for when choosing an operating frequency. Specifically, the lower the frequency, the longer the wavelength, which eases the sampling requirements to avoid the phase aliasing effect discussed above. In the 915 MHz band the wavelength is about 30 cm, which means the phase measurement must be sampled at least twice as often as any metal object to be detected might change range by 15 cm. Also, the lower the frequency the less the propagation path loss. However, lower frequencies mean larger antennas, and also the minimum size of metal objects to be detected is larger.

Figure 7:
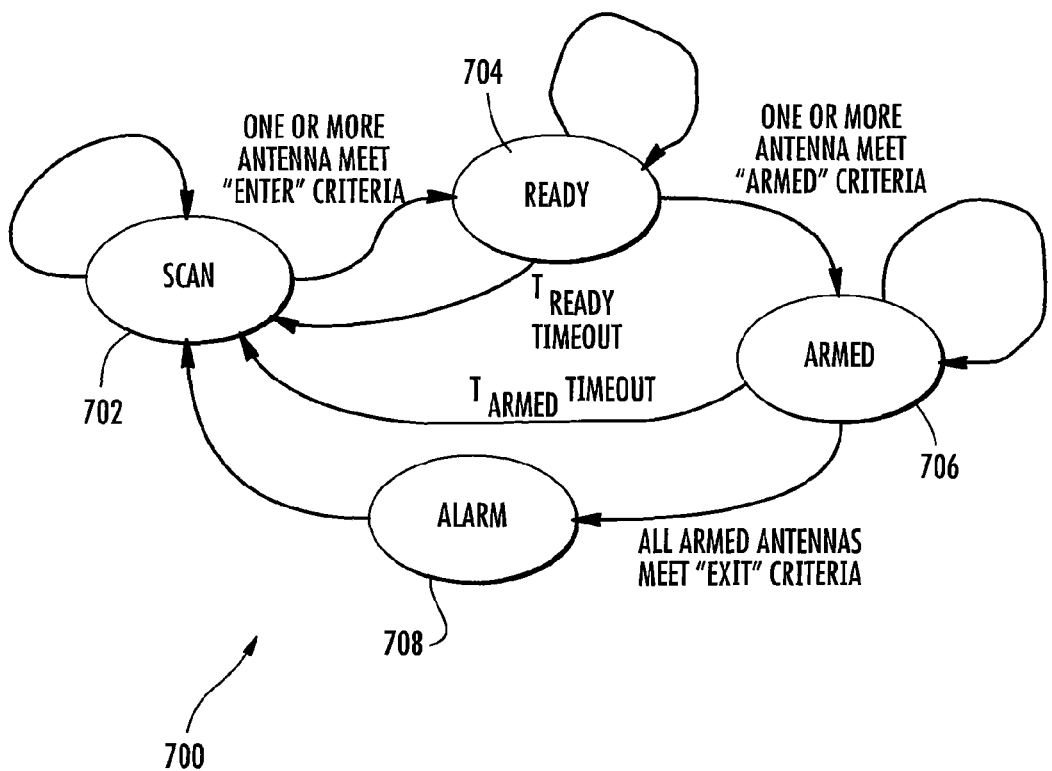
FIG. 7 is a state machine diagram illustrating the method of operation of an RF metal detector according to example embodiments of the invention.

FIG. 7 illustrates the state machine 700 for a method associated with an RF metal detector according to example embodiments of the invention. FIG. 7 illustrates four main modes as listed below.

SCAN mode 702 is the normal mode of operation when no moving objects have been sensed in or near the interrogation zone. The system is monitoring the power levels on the antennas, waiting for one or more power levels to satisfy a threshold indicating an object may be moving into the interrogation zone.

READY mode 704 is entered when the power level on one or more antennas exceeds the "enter" threshold (THRESHOLD1) and the phase is decreasing (slope <0) and the power in increasing (slope >0). The time of entering the READY state is recorded as "T1". The detector must pass criteria to proceed to the ARMED state within $T_{READY}$ seconds, otherwise the detector returns to the SCAN mode.

ARMED mode 706 is entered when the power level on one or more antennas exceeds THRESHOLD2. The antenna exceeding the threshold is marked as "armed" and the time is recorded as T3. All antennas that are armed or become armed by their power exceeding THRESHOLD2 must satisfy the "exit" criteria within $T_{ARMED}$ seconds or the detector mode is returned to SCAN.

ALARM mode 708 is entered when all antennas which had been armed pass the exit criteria. The alarm signal is sent and the detector is returned to the SCAN mode.

A summary of the various criteria mentioned in the above mode descriptions above is as follows:

An object must satisfy the "Enter" and "Exit" criteria within some fixed period of time defined as $T_{READY} + T_{ARMED}$;

The "Entering" criteria is defined by,
  the power on one or more antennas exceeding THRESHOLD1, and simultaneously,
  the power slope being positive, and simultaneously,
  the phase slope being negative;

The criteria to enter the ARMED state is designed to assure the object is metal and of significant size (large scatter aperture) by requiring the power on one or more antennas exceed THRESHOLD2 after the Entering criteria is met;

The "Exit" criteria is defined by,
  The power on all antennas which were armed be less than THRESHOLD3, with,
  Power slope negative, and
  Phase slope positive.

The parameters which are used or implied in the above criteria and mode transitions are as follows.

THRESHOLD1 is the "Enter" criteria power threshold. Setting this threshold depends on,
  PTX, the transmitter power (e.g., 30 dBm),
  G, the antenna gain (e.g., 8 dB),
  FC, the carrier frequency (e.g., 915 MHz),
  AS, the minimum scatter aperture of the metal objects to be detected (e.g., 0.01 meters$^2$),
  R, the range to detect entering (e.g., 4 meters),
  Using the example values above together with the Friis propagation equation THRESHOLD1=−35 dBm.

THRESHOLD2 is the armed power threshold. Using the same example parameters as above except the range R=2.5 meters, the result is THRESHOLD2=−23 dBm.

THRESHOLD3 is the Exit power threshold. This is set some nominal level below THRESHOLD2, as an example, THRESHOLD3=THRESHOLD2−3 dB.

$T_{READY}$ is the time allowed for an object moving into the interrogation zone to get to the armed condition, which represent the object being somewhere in the middle of the interrogation zone. This parameter will depend on the size of the interrogation zone and the expected minimum speed of the objects to be detected. Several seconds may be used in a retail EAS application.

$T_{ARMED}$ is the time allowed for an object that appears to have gone into the interrogation zone to begin exiting. This parameter will depend on the expected minimum speed of the objects to be detected. Several hundred milliseconds may be used in a retail EAS application, say 500 milliseconds to one second.

FIGS. 8A-8D illustrate the method associated with an example embodiment of the RF metal detector. FIGS. 8A-8D illustrate process 800 in flowchart form. As before, the process 800 is shown as a series of subprocess blocks, beginning with block 802 in FIG. 8A. At block 804 the processor will select the next antenna in the multiplexing sequence. At block 806, the transmit RF power is turned on. The baseband I and Q signals are sampled at block 808 and possibly further digitally filtered at block 810 to reduce the effects of noise. The filtered I and Q measurements are used to compute the phase and power of the RF received signal at block 812 using the four quadrant arctangent phase formula, $$\theta_{RX} = a\tan 2(Q,I),$$

and the power formula, $$P_{RX} = I^2 + Q^2.$$

This process of sampling and filtering I and Q repeats to produce a series of measurements $\theta_{RX}(n)$ and $P_{RX}(n)$. If the metal detection method is integrated together with another wireless function on the same device, such as a Gen2 RFID interrogator, then this series of measurements will be generated from periods suitable to measure the reflected carrier signal, such as during receive windows in a Gen2 inventory process.

Figure 8A:
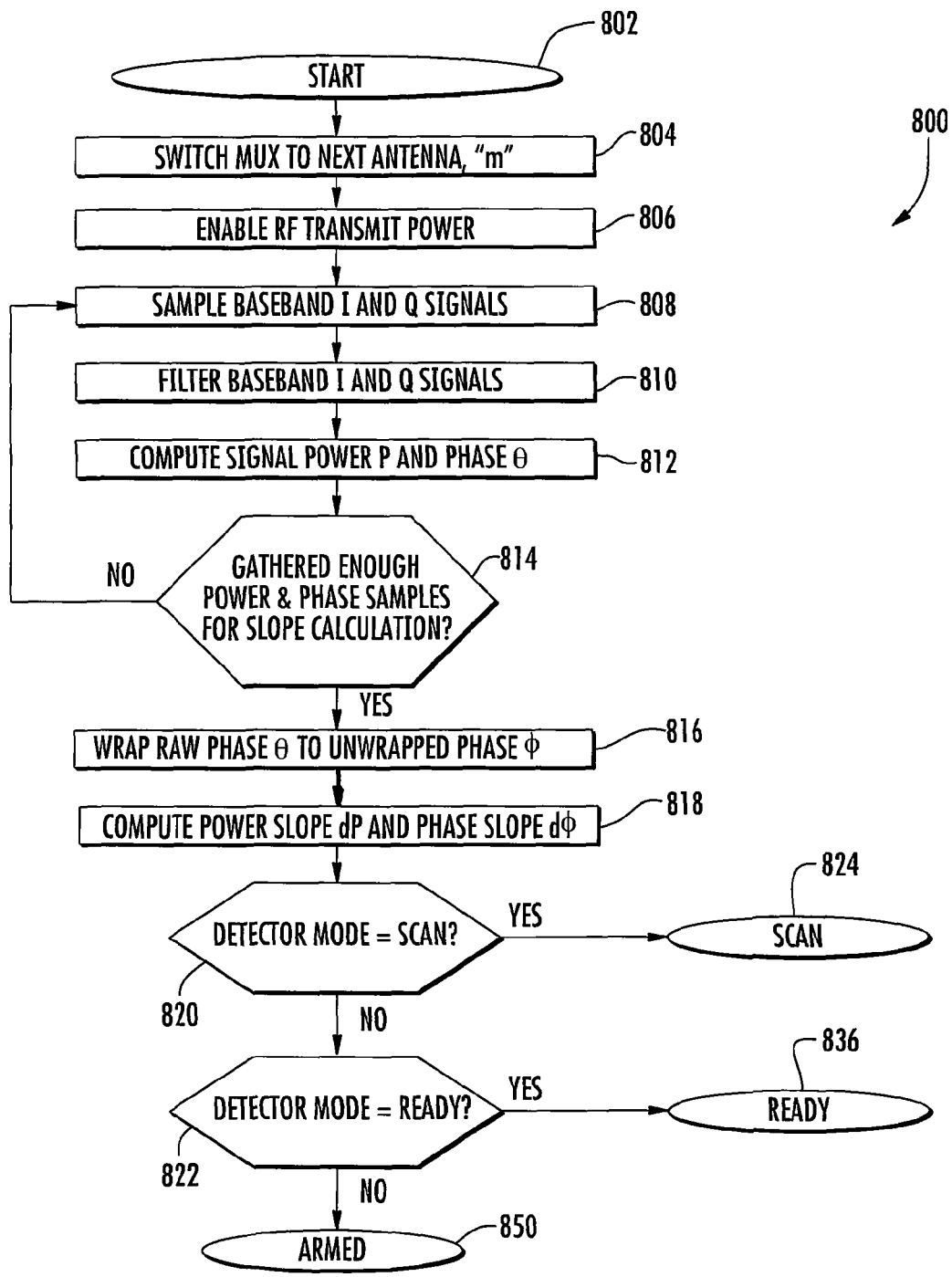
FIGS. 8A, 8B, 8C and 8D show a flowchart illustrating the details of the operation of the state machine shown in FIG. 7.

Still referring to FIG. 8A, after enough phase and power samples have been gathered at block 814, the phase measurements are unwrapped at block 816 to produce the phase trajectory $\phi_{RX}(n)$. Alternatively the phase could be unwrapped sample-by-sample as each new $\theta_{RX}(n)$ phase measurement is acquired. Typically 10 to 20 milliseconds worth of samples would be used to calculate the phase and power slopes at block 818. If the phase and power samples were calculated about once per millisecond, then this would correspond to 10 or 20 samples for the slope calculations. After the slopes are calculated, the system checks what mode it is in at blocks 820 and 822: SCAN, READY, or ARMED.

Figure 8B:
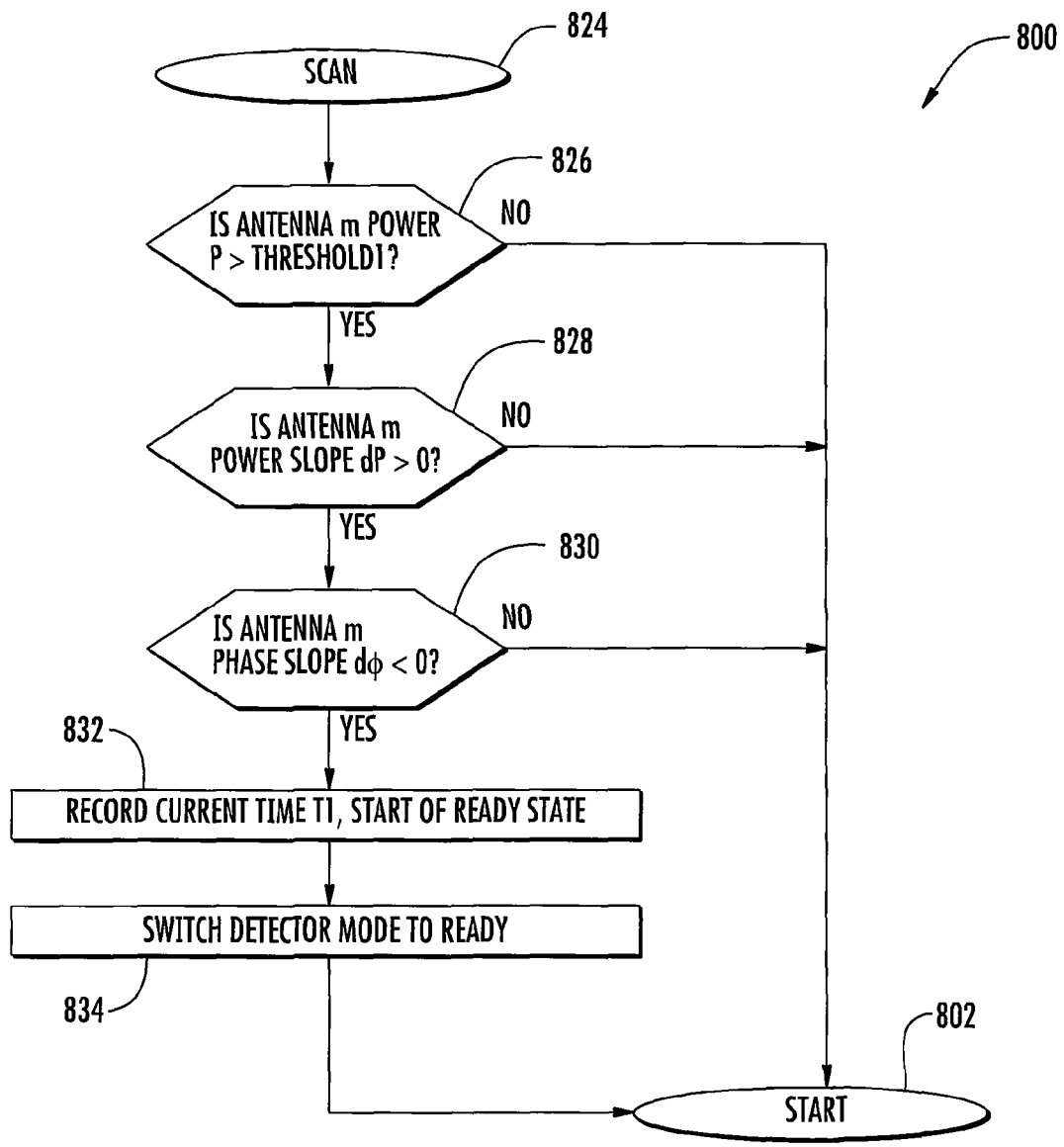

In the SCAN mode at block 824 processing branches to FIG. 8B and the power is compared to THRESHOLD1 at block 826. The phase and power slopes are also checked at blocks 828 and 830 to see if the power is increasing and the phase is decreasing, which is the indication that the received signal is the reflection from an object moving into the interrogation zone. If any of these three conditions are not satisfied, the system returns to start 802 wherein it selects the next antenna in the processor begins the process again. On the other hand, if all three of the above mentioned conditions are met, then it can be assumed that an object is moving into the interrogation zone. The current time is recorded as T1 at block 832, the time the object began entering the system. The detector mode is changed to READY at block 834. The process returns to start 802 to gather more samples.

Figure 8C:
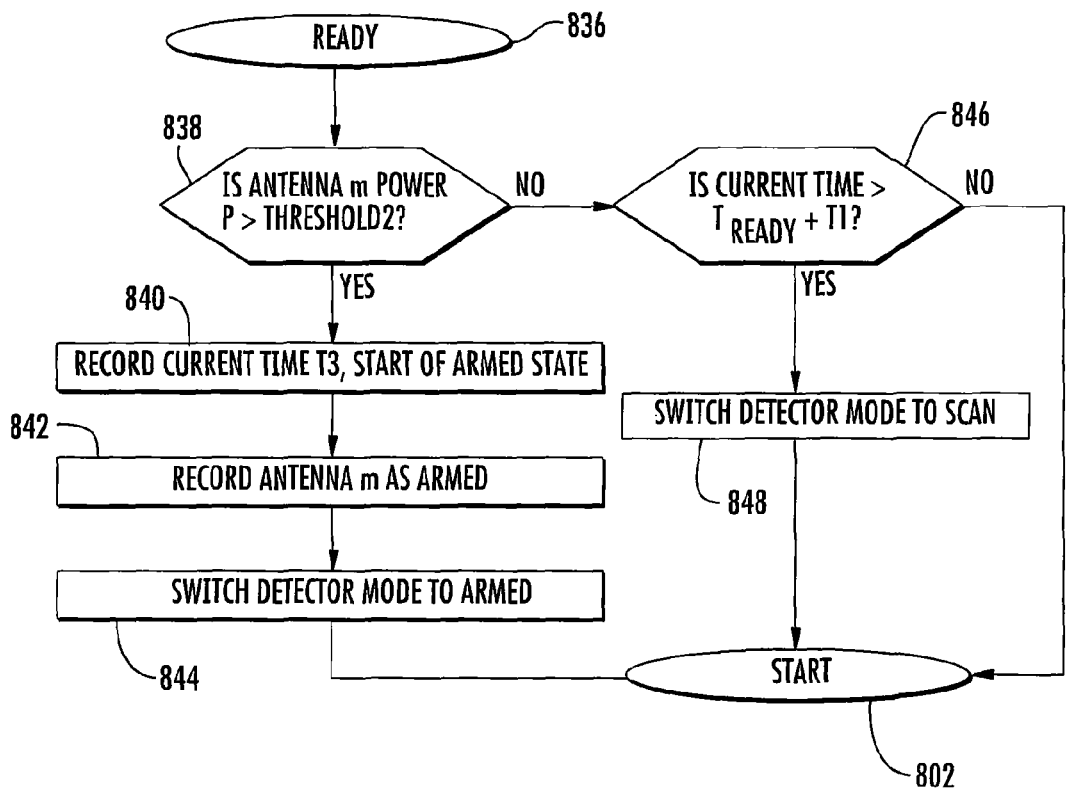

In the READY mode at block 836 processing branches to FIG. 8C where the power is compared to THRESHOLD2 at block 838. If this condition is met then the current time is recorded as T3 at block 840, the time when the object is confirmed in the interrogation zone. Furthermore, the individual antenna is recorded as armed at block 842, which means subsequently in the ARMED state the power, power slope, and phase slope for this antenna must meet the exit criteria within $T_{ARMED}$ time. The overall detector state is also set to ARMED at block 844 so that in the next iteration of the algorithm the processor will execute the ARMED portion of the flowchart logic. If, in the READY state the current antenna power is not above THRESHOLD2, then the current time is compared to $T_{READY}$+T1 at block 846. If this time has been exceeded, the detector mode is switched back to SCAN at block 848. This condition is typically indicative of an object, which has moved nearby the interrogation zone, but has not gone through it.

Figure 8D:
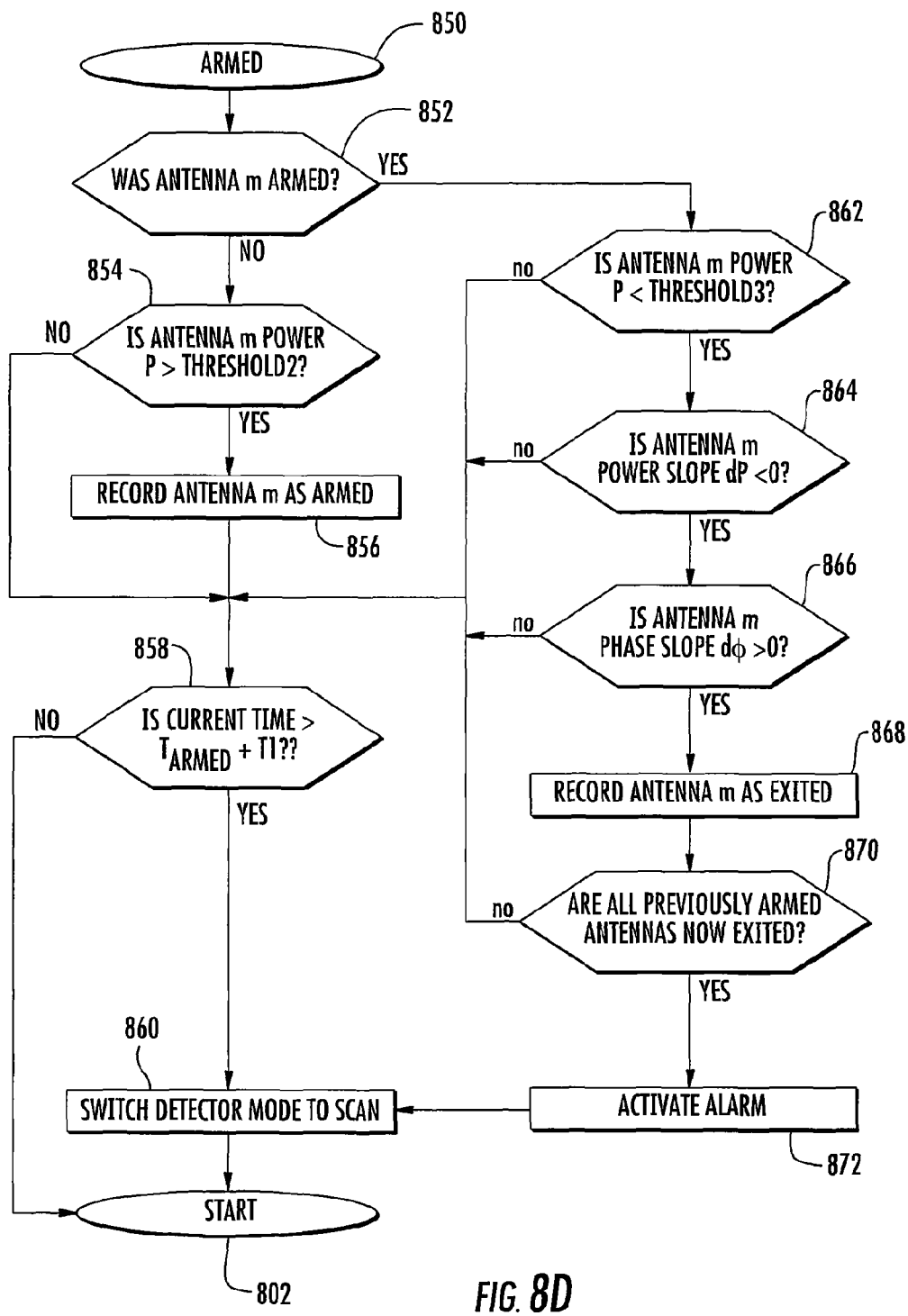

The flow in the ARMED state 850 as shown in FIG. 8D depends on whether the current antenna has been set to armed at block 852. If the current antenna has not been set to armed, then the power is compared to THRESHOLD2 at block 854. If the current antenna's power is greater than THRESHOLD2 then this antenna is marked as armed at block 856. The current time is checked against the timeout period at block 858. If the timeout has expired then the detector mode is switched back to SCAN at block 860 and the process returns to start 802. It should be understood that whenever the detector mode is switched back to SCAN that all antennas that were previously marked as armed and cleared of that state.

Returning to FIG. 8D, if the antenna was previously armed then the Exit criteria are checked. Determinations are made as to whether the power is less than THRESHOLD3 at block 862, whether the power slope is negative at block 864, and whether the phase slope is positive at block 866. If any of the conditions are not satisfied, then the timeout condition is checked. If all of these conditions are satisfied, then the antenna is marked as exited at block 868. Now the detection system checks at block 870 to see if all antennas previously marked as armed are now exited. If so, then the system enters the ALARM state at block 872 wherein the appropriate alarm messages or signals are generated. The system then proceeds back to the SCAN mode 802.

Note that other RF metal detector algorithms can be used, such as neural networks, fuzzy inference systems, Bayesian decision theory, etc. These alternatives do not depart from the invention for which embodiments are disclosed herein. With any of these methods, decision statistics can be based on reflections of RF signals from metal objects.

As previously mentioned, the RF metal detector according to example embodiments of the invention can be integrated into other devices. As an example, a system that combines an RF metal detector and an RFID-based electronic article surveillance (EAS) function will now be described. The Gen2 RFID protocol is a half-duplex communications system wherein the interrogator transmits commands then listens for replies from the tags. The interrogator commands are lowpass waveforms typically limited to around 200 KHz or so of modulation bandwidth around the carrier. After the interrogator sends a command, it transmits carrier signal while it listens for a response from any tags that may be in the interrogation zone. The modulation of the transmit carrier overlaps the frequency of the reflected signal from the moving metal objects, which is typically in the tens or hundreds of Hertz. Because the frequencies of the modulated RFID command and the reflected return signal overlap it is difficult to accurately measure the I and Q signals and thus the power and phase of the reflected signal during RFID command transmission. However, the RFID interrogator's receive period it very well suited to measure the low frequency I and Q reflected return signal in order to accomplish the metal detection function. Common Gen2 configurations used for EAS systems employ tag backscatter communications in which the tag's signal energy is a bandpass signal with energy centered in the hundreds of kilohertz. The tag's signal level is also typically in the range of −40 dBm to −80 dBm. Lowpass filtering used to measure the I and Q receive signals for metal detection will filter out the much higher frequency, weaker power tag signal. Common Gen2 link configurations used in EAS systems have hundreds of tag receive slots per second, e.g., anywhere from 300 to 600 slots per second, depending on the link configuration and how many tags are in the interrogation zone. Since the phase and power of the reflected transmit carrier signal can be measured in each slot, anywhere from 1.5 milliseconds to 3 milliseconds pass between measurements. These time periods are very well suited to estimate the phase and power curves of FIG. 3.

Figure 9:
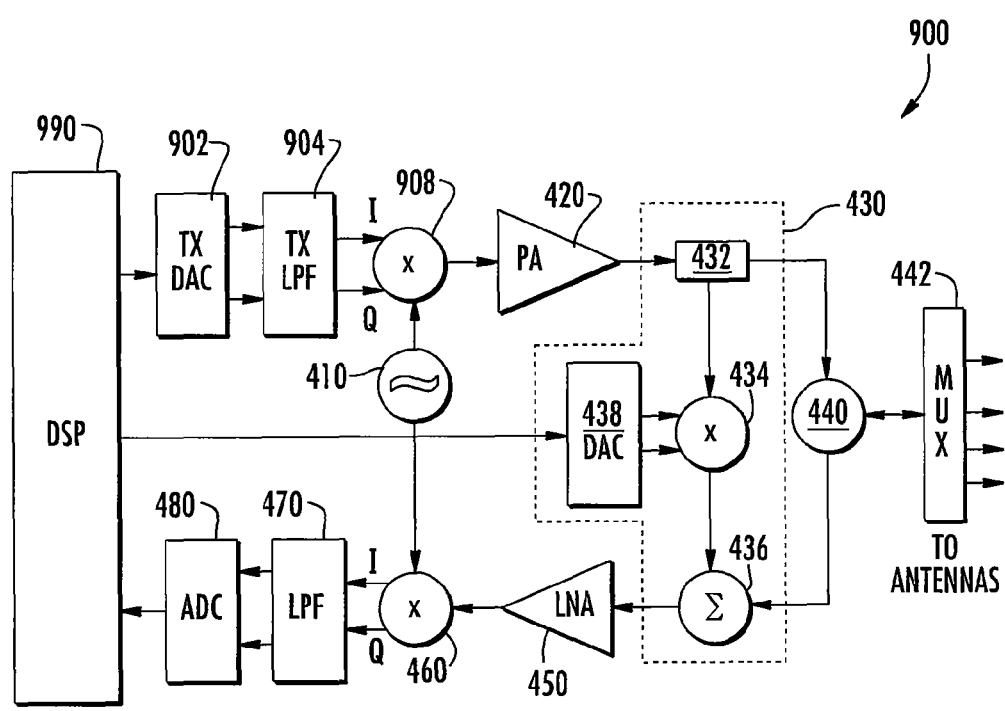
FIG. 9 is a detailed functional block diagram of an EAS system with which the RF metal detector of example embodiments of the invention can be integrated.

A block diagram of an EAS system 900 with an RFID interrogator and RF metal detector is shown in FIG. 9. The system includes the same or similar components as included in the RF metal detector shown in FIG. 4. These components are referred to by like reference numbers. There are additional components needed to send commands to the RFID tags, specifically a TX DAC 902 to generate baseband modulation, which encode the commands to the RFID tags, TX LPF 904 to provide anti-image filtering after the TX DAC, and a modulation mixer 908 to translate the baseband signal to RF. The modulation used for passive and semi-passive RFID systems is generally large carrier amplitude modulation (AM), suppressed carrier AM, or single sideband AM. Typically, AM signaling is used in RFID since the tags are simple and use envelope detection to decode the interrogator commands. Angle modulation techniques such as phase modulation (PM) or frequency modulation (FM) are not common choices for simple RFID air interfaces, although they could be used. In the system of FIG. 9, DSP 990, unlike the DSP in FIG. 4, executes additional routines to carry out the RFID functions needed for the operation of EAS system 900.

Figure 10:
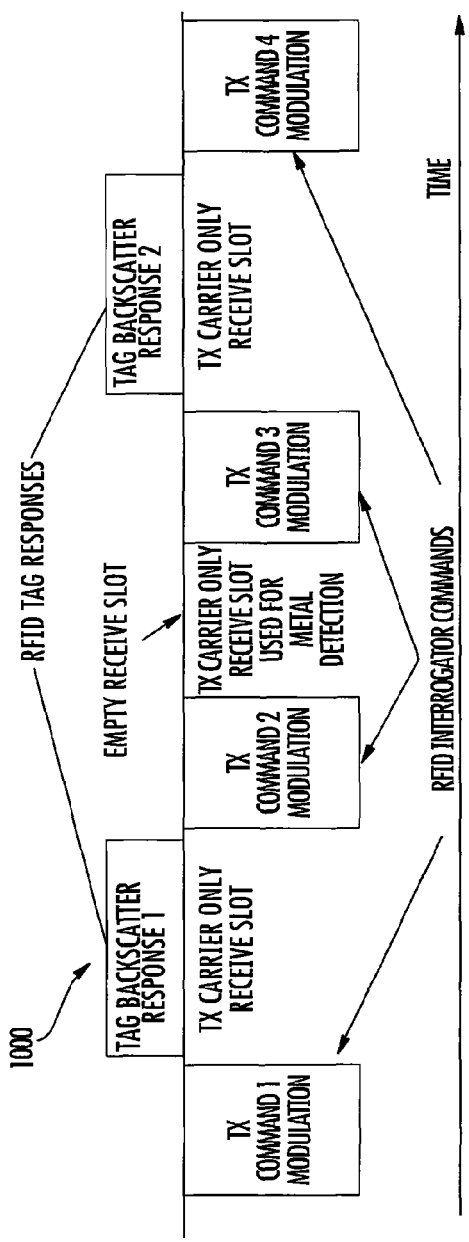
FIG. 10 is a graph of an RFID timing sequence for the system of FIG. 9.

FIG. 10 shows an example timing sequence 1000 for an RFID interrogator. This sequence begins after the interrogator has selected an antenna through the antenna MUX and turned on the RF carrier to that antenna. This action transmits RF energy to any tags in the interrogation zone so that these tags are activated and begin listening for commands. The RFID communication sequence begins with the interrogator modulating the RF carrier with a command designated "Command 1" in FIG. 10. After the command is sent, the interrogator continues by transmitting RF carrier, which tags in the interrogation zone can modulate responses onto by varying their scatter aperture, a technique known as backscatter modulation. FIG. 10 shows a tag response to command 1, designated "response 1" in the sequence. After the tag response, the interrogator may send additional commands, as indicated for example by "Command 2" in FIG. 10. In the example shown, no tag responds to this command, resulting in an empty slot that can be used for metal detection. The interrogator may continue with more commands and tag responses as shown in FIG. 10. Note that the diagram of FIG. 10 is not to scale. The interrogator modulation depth is commonly 80% or higher, up to 100% for suppressed carrier systems, such as Gen2 interrogators using the PR-ASK line code/modulation from the Gen2 specification. The interrogator will typically send out +30 dBm modulated signal. However, the tag backscatter response represented in FIG. 10 in reality has a signal level somewhere from −40 dBm to −80 dBm. The backscatter response is much weaker than the interrogator transmit signal.

Figure 11:
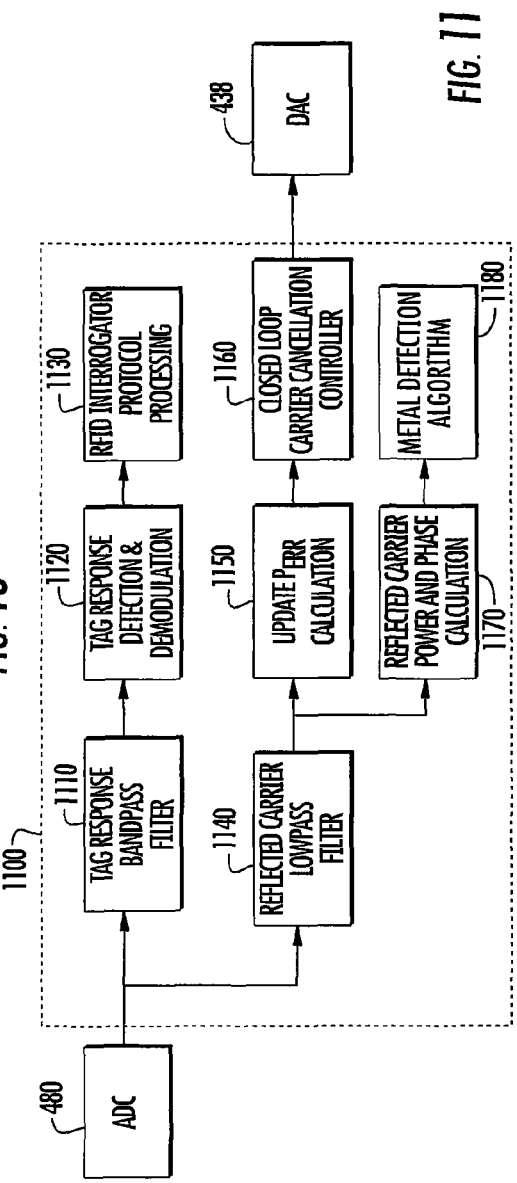
FIG. 11 is a signal flow diagram for the processor of an example embodiment of the invention, where the processor is handling both RF metal detection and RFID functions.

FIG. 11 depicts a signal flow diagram showing the operation of a processor controlling how the receive signal may be processed during the RFID receive slots to accomplish both RFID interrogator functions and metal detection functions in an EAS system. During the receive slots the interrogator transmits pure RF carrier. Tags which are replying will backscatter encoded responses in the frequency range from 100 KHz to 640 KHz. On the other hand, the reflected carrier from moving objects will have a very low frequency content. Within a single RFID receive slot the processor can measure the DC values of the I and Q signals and use these values to estimate the power and phase of the reflected carrier. The example of FIG. 11 is based on the system shown in FIG. 9. The signal processing flow is conceptually illustrated as memory 1100 in which firmware is stored. The firmware causes the DSP to perform the necessary functions. In some embodiments, the memory is built into a DSP such as DSP 990 from FIG. 9. FIG. 11 shows the signal sampled from ADC 480 from FIG. 9 coming into the DSP 990. In this example embodiment, the signal processing block 1100 of FIG. 11 executes entirely within the DSP 990. The top branch of the signal's processing consists of a bandpass filter 1110 to isolate the possible tag response in the 100 KHz to 640 KHz range. The output of this bandpass filter is processed by the tag detection and demodulation block 1120, which passes the processed data to the RFID protocol processor 1130. The lower branch starts with a lowpass filter 1140 to estimate the DC components of the I and Q inputs. This filter may be based on the previously discussed Blackman-Harris filter, or some other lowpass filter design. The output of block 1140 is passed to the carrier cancellation path consisting of the current $P_{ERR}$ calculation, which is passed to the controller block 1160. This control function may be executing the algorithm shown in FIG. 5. As previously discussed, this update algorithm may only be executed approximately every 100 milliseconds to keep the closed loop bandwidth low. The output of the carrier cancellation controller block 1160 is passed to the DAC 438. In addition, the output of the lowpass filter block 1140 is passed to the reflected carrier power and phase calculation block 1170. The output of block 1170 is passed to the metal detection algorithm 1180. This algorithm may be the implementation previously described, or some alternative embodiment to detect metal objects in the interrogation zone using reflected RF energy.

It cannot be overemphasized that the description above of a combined RF metal detector and EAS system is just one example of how the RF metal detector of embodiments of the invention can be included in a system with multiple functions. As other examples, the RF metal detector can be used in a conveyor system, a robotic system or any other system used in manufacturing or distribution. In such systems, space may be at a premium, therefore, a single antenna may be used in a mono-static configuration. However, the RF metal detector according to any of the embodiments described herein could be adapted to such systems if desired. An RF metal detector according to embodiments of the invention can also be included in various types of security systems, including those using biometric or other algorithmic identification techniques.

The processor used to implement an embodiment of the invention may be a general purpose digital signal processor, such as those commercially available from Texas Instruments, Inc., Analog Devices, Inc., or Freescale Semiconductor, Inc. It could as well be a field programmable gate array (FPGA) as are available from Xilinx, Inc., Altera Corporation, or other vendors. The processor could also be a fully custom gate array or application specific integrated circuit (ASIC). Any combination of such processing elements may also be referred to herein as a processor or DSP. One example embodiment uses a Blackfin® programmable DSP available from Analog Devices, Inc., capable of 500 MHz operation with integrated dual multiply/accumulate processors for up to $10^9$ multiply/accumulate operations per second.

The metal detection systems and methods described above use a "DC-coupled" approach, wherein the I and Q outputs of a receive mixer are DC coupled to an ADC. The DC coupling creates DC offsets in the baseband. Controlling DC offsets can require more expensive analog hardware for the filtering and amplification in baseband and in the analog-to-digital converter. An alternative embodiment is to AC couple the baseband. In this case the low frequencies of the reflected carrier signal will be blocked by the AC coupled baseband signal path. To allow measurement of the I and Q signals, which provides the basis for measuring the phase and power trajectory of the reflected signals, the transmitter can employ a low-level modulation on the carrier. This low level modulation should be something easily measureable in the processor, such as a Barker sequence, Gold code, or any number of other low correlation signals. The modulation sequence from the transmitter is reflected off the objects in the interrogation zone and measured in the processor in a manner similar to that already described; only in this case instead of a Blackman-Harris window or other such FIR lowpass digital filter, the modulation sequence itself is used in a cross-correlation filter.

The outputs of the cross-correlation filter are then used in exactly the same fashion as the digital filter outputs in a DC coupled embodiment.

Figure 12:
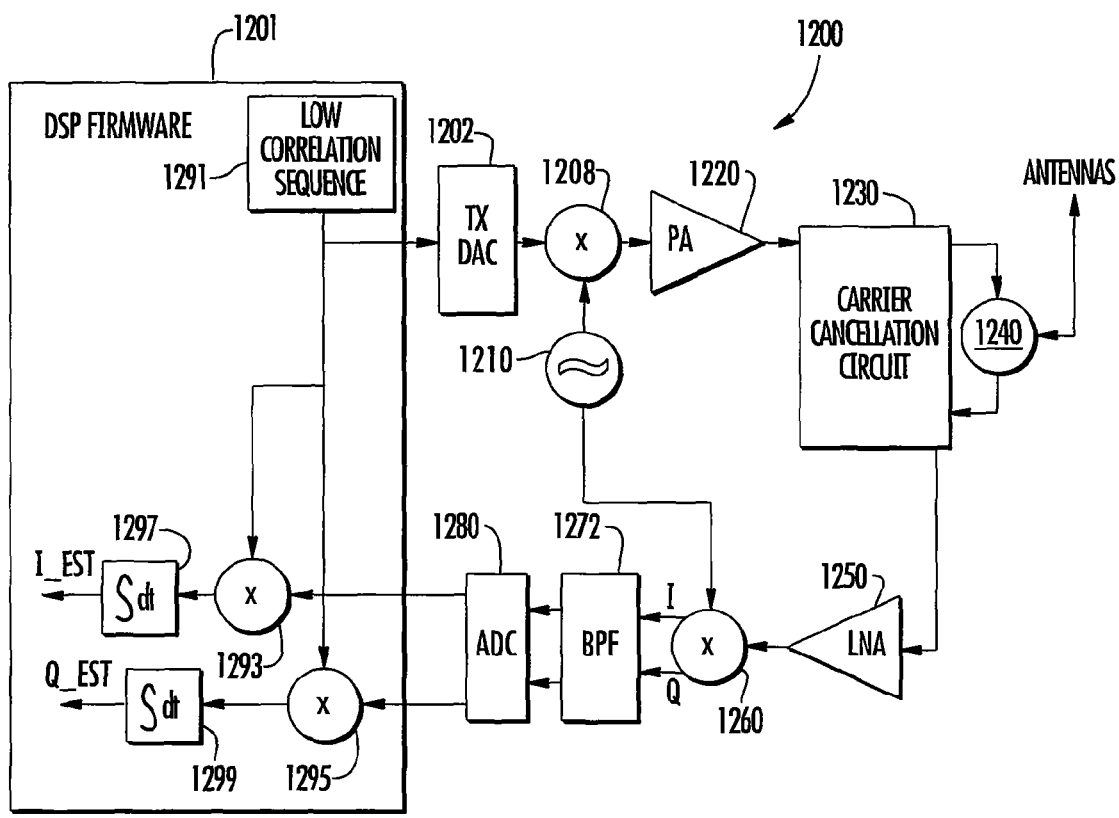
FIG. 12 is a detailed functional block diagram of an RF metal detector according to additional example embodiments of the invention. In this example, the RF metal detector uses an "AC-coupled" design.

FIG. 12 shows the elements used in an example RF metal detector 1200 wherein the metal detection is accomplished with an AC-coupled design. The transmitter generates a low correlation signal, denoted s(n), such as a Barker code, Gold code, or M sequence. The low correlation sequence 1291 is stored in the DSP (not shown) in memory 1201. The sequence is sent out through DAC 1202 and modulator 1208 to the antennas. A portion of the radiated RF power will be reflected off moving objects in the interrogation zone and back to the antenna. The received signal passes through the receiver and is mixed down to baseband by the mixer 1260. The baseband I and Q signals are filtered by the bandpass filter 1272 with a highpass cutoff frequency. Typical values for the highpass cutoff frequency are around 50 KHz. The filter output is sampled by the ADC 1280 and processed further inside the DSP 1290. The DSP takes a copy of the low correlation sequence 1291 and multiplies it with the incoming I and Q sampled signals, and then integrates the outputs of the multipliers over the duration of the sequence. The combination of multipliers 1293 and 1295 with integrators 1297 and 1299 can be implemented digitally as:

$$I\_est = \sum_{n=0}^{N} s(n) \cdot I(n)$$

$$Q\_est = \sum_{n=0}^{N} s(n) \cdot Q(n),$$

where N denotes the length of the low correlation sequence. The outputs I_est and Q_est fulfill the same roll as the digitally filtered I and Q estimates in the preferred embodiment using DC coupling. The I_est and Q_est samples are used to estimate reflected power and phase as well as updating the DAC 1238 for carrier cancellation.

The chip rate, or pulse rate, used to generate the signal must be fast enough so that the reflected signal passes through the bandpass filter in the receiver baseband without significant distortion. Alternatively the signal could be modulated up past the high pass cutoff frequency FHP. For example, the 13-point Barker sequence is:

s(n)={+1 +1 +1 +1 +1 −1 −1 +1 +1 −1 +1 −1 +1}.

Figure 13:
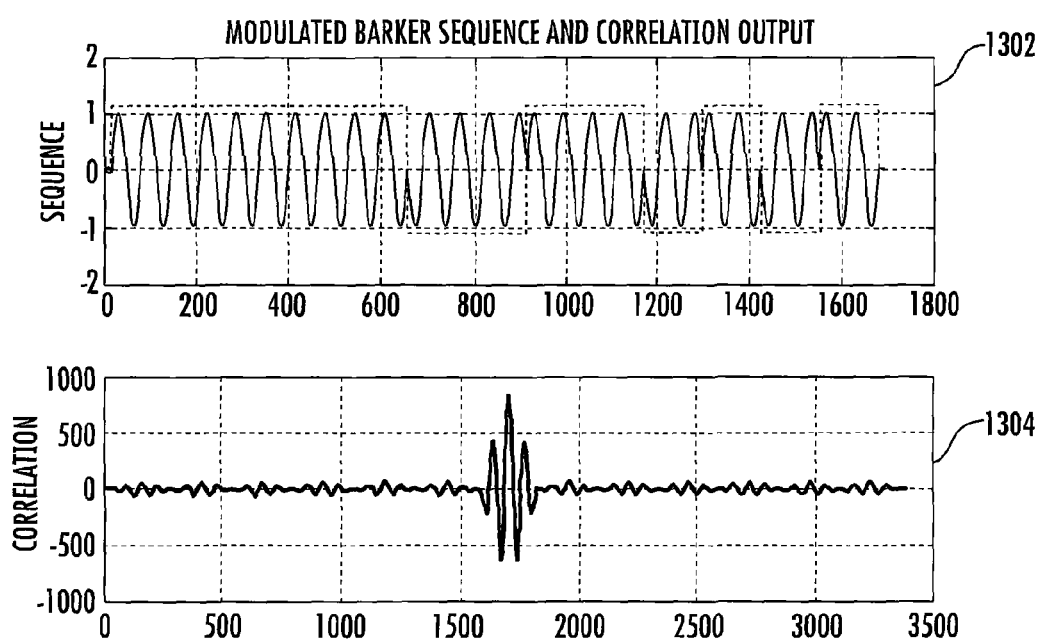
FIG. 13 is a graph illustrating a modulated Barker sequence, which may be generated by the transmitter in the AC-coupled system of FIG. 12. The correlation output from the sequence is also illustrated.

The long sequence of +1's create substantial low frequency energy in this sequence. However, when modulated by an 8 cycle per bit sine wave the resulting signal has energy which is shifted higher away from DC. This signal, 1302, and its correlation function 1304 are shown in FIG. 13. The resulting signal has good correlation properties, making it easy to detect and discriminate from background noise.

The duration of the sequence should be chosen so that time duration is long enough to give good noise averaging, but not significantly longer than it takes the phase changes caused by a moving object to change by more than a few degrees. In the context of the previous discussion of the detector shown in FIG. 4, $T_{observation}=N/F_S$ in the present case. In the previous example $T_{observation}$ was determined to be 182 microseconds for about 2 degrees of phase movement. If the sampling rate FS is 10 MHz, this means the length of sequence 1291 in FIG. 12 should be about 1820 samples. The sequence shown in FIG. 13 is approximately 1700 samples long and when sampled at $F_S$=10 MHz. The signal energy is around 300 KHz, which would work very well with a Gen2 protocol RFID receiver.

With regard to integration of the AC-coupled metal detector design into an EAS system, since the sequence 1291 in FIG. 12 may have frequency content similar to the desired Gen2 tag backscatter, this approach of AC-coupled reflection measurement may require that the sequence 1291 be transmitted only during empty slots, i.e. when no tag replies. Under normal operation of the Gen2 protocol about one third of the slots are empty when there are many tags in the interrogation zone. If there are no tags then all of the slots are empty. Even in the case of many tags being present, there will be 10's to 100's of empty slots per second, depending on the Gen2 link configuration. This will give enough empty slots to adequately sample the reflected RF signal for the metal detection function.

Finally, note that when this AC-coupled approach is integrated with an RFID function, the sequence 1291 will be summed with a DC offset so there is a carrier signal present for the passive RFID tags to remain powered. The sequence 1291 is summed at a level much lower than the carrier signal, in some embodiments, 20 dB to 30 dB less than the carrier signal. The sequence 1291 is a low level amplitude modulation on the carrier. Phase modulation is also possible.

The example devices and methods in this disclosure can achieve ranges of 5 meters or more with reasonably sized antennas, for example 30 cm in diameter. The example RF metal detection devices and methods can be integrated into other ISM band devices such as RFID readers or IEEE 802.11 & 802.15 devices. In some embodiments, a general purpose processor such as a DSP, microcontroller or microprocessor is used and firmware, software, or microcode can be stored in a tangible medium that is associated with the device. Such a medium may be a memory integrated into the processor, or may be a memory chip that is addressed by the controller to perform control functions. Such firmware, software or microcode is executable by the processor and when executed, causes the controller to perform its control functions. Such firmware or software could also be stored in or on a tangible medium such as an optical disk or traditional removable or fixed magnetic medium such as a disk drive used to load the firmware or software into an RF metal detector system.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system comprising: a receiver to receive a returned RF signal including a carrier signal reflected from a metal object; a transmitter to transmit an incident radio frequency (RF) signal modulated with radio frequency identification (RFID) commands; and a processor connected to the transmitter and the receiver to extract modulated RFID responses from the returned RF signal to detect an RFID tag, and detect metal objects by measuring at least one parameter of the carrier signal in the returned RF signal.

2. The system of claim 1 further comprising a digital-to-analog converter connected to the processor to control modulation of the incident RF signal with the RFID commands.

3. The system of claim 1 further comprising an antenna connected to at least one of the transmitter and the receiver.

4. The system of claim 3 wherein the at least one parameter includes phase and power of the carrier signal.

5. The system of claim 3 wherein the antenna fluffier comprises a plurality of antennas.

6. The system o claim 5 wherein the processor uses the plurality of antennas when arranged on different sides of an interrogation zone with the plurality of antennas arranged in different sides to discriminate betwen objects in the interrogation zone and objects outside the interrogation zone.

7. The system of claim 5 wherein some of the antennas are connected to the receiver and other of the antennas are connected to the transmitter.

8. The system of claim 3 wherein the processor discriminates between moving metal objects and stationary metal objects by measuring phase and/or power over time.

9. The system of claim 8 wherein the processor measures the phase and/or power during an RFID receive slot.

10. The system of claim 3 further comprising a couplet disposed between the antenna and the transmitter and the receiver to enable the antenna to he used for both sending the incident RF signal and receiving the returned RF signal.

11. A method of detecting objects using radio frequencies, the method comprising:
    transmitting an incident radio frequency (RF) signal;
    modulating the incident RF signal with an RFID command;
    extracting an RFID response from the returned RF signal;
    measuring a phase and a power of a carrier signal of a returned RF signal;
    comparing the phase and the power over time to entry criteria;
    making an entry determination as to when the phase and the power over time meet the entry criteria for a specified period of time; and
    signaling that a metal object has been detected based on the determination.

12. The method of claim 11 further comprising making an exit determination as to whether the power meets an exit criteria for an additional period of time prior to the signaling that the metal object has been detected.

13. The method of claim 12 wherein the making of the exit determination comprises making the exit determination using a plurality of antennas sensing the returned RF signal.

14. Apparatus comprising:
    means for transmitting an incident radio frequency (RF) signal;
    means for modulating the incident RF signal with an RFID command;
    means for extracting an RFID response from the returned RF signal;
    means for measuring a phase and a power of a carrier signal of a returned RF signal;
    means for comparing the phase and the power over time to entry criteria;
    means for determining when the phase and the power over time meet the entry criteria for a specified period of time; and
    means for signaling that a metal object has been detected, the means for signaling being responsive to the means for determining.

15. The apparatus of claim 14 further comprising means for evaluating whether the power meets an exit criteria for an additional period of time, wherein the means for signaling is further responsive to the means for evaluating.

16. The apparatus of claim 15 wherein the means for determining and the means for evaluating are operably responsive to the returned RF signal as sensed at a plurality of antennas connected to the means for measuring.

* * * * *

UNITED STATES PATENT AND TRADEMARK OFFICE
CERTIFICATE OF CORRECTION

PATENT NO.        : 9,171,440 B2
APPLICATION NO.   : 13/813464
DATED             : October 27, 2015
INVENTOR(S)       : Thomas J. Frederick It is certified that error appears in the above-identified patent and that said Letters Patent is hereby corrected as shown below:

IN THE CLAIMS:

In column 21, claim 5, please change line 1 to:

"5. The system of claim 3 wherein the antenna further com-"

In column 21, claim 6, please change line 3 to:

"6. The system of claim 5 wherein the processor uses the"

In column 21, claim 6, please change line 6 to:

"different sides to discriminate between objects in the interro-"

In column 21, claim 10, please change line 16 to:

"10. The system of claim 3 further comprising a coupler"

In column 21, claim 10, please change line 18 to:

"receiver to enable the antenna to be used for both sending the"

Signed and Sealed this
Twenty-ninth Day of March, 2016

Michelle K. Lee
*Director of the United States Patent and Trademark Office*